(12) United States Patent
Kennedy et al.

(10) Patent No.: US 9,335,893 B2
(45) Date of Patent: May 10, 2016

(54) METHOD AND APPARATUS FOR DYNAMICALLY GROUPING ITEMS IN APPLICATIONS

(75) Inventors: Ian Kennedy, Helsinki (FI); Teemu Mikkonen, Oulu (FI); Jarno Vayrynen, Oulu (FI); Katja Kytokorpi, Oulu (FI); Jörg Land, Hamburg (DE); Caitlin Winner, Cambridge, MA (US)

(73) Assignee: HERE GLOBAL B.V., Veldhoven (NL)

( * ) Notice: Subject to any disclaimer, the term of this patent is extended or adjusted under 35 U.S.C. 154(b) by 754 days.

(21) Appl. No.: 12/649,014

(22) Filed: Dec. 29, 2009

(65) Prior Publication Data

US 2011/0161883 A1 Jun. 30, 2011

(51) Int. Cl.
*G06F 3/0482* (2013.01)

(52) U.S. Cl.
CPC .................................... *G06F 3/0482* (2013.01)

(58) Field of Classification Search
CPC .... G06F 3/0481; G06F 3/0482; G06Q 10/107
USPC .......................................... 715/739, 751, 837
See application file for complete search history.

(56) References Cited

U.S. PATENT DOCUMENTS

| | | | |
|---|---|---|---|
| 7,697,785 B2 * | 4/2010 | Chiu et al. | 382/284 |
| 7,843,454 B1 * | 11/2010 | Biswas | 345/473 |
| 7,882,056 B2 * | 2/2011 | Begole et al. | 706/54 |
| 7,908,327 B2 * | 3/2011 | Kucharewski et al. | 709/206 |
| 8,392,836 B1 * | 3/2013 | Bau et al. | 715/739 |
| 2004/0017376 A1 * | 1/2004 | Tagliabue et al. | 345/581 |
| 2005/0076013 A1 * | 4/2005 | Hilbert et al. | 707/3 |
| 2005/0189415 A1 * | 9/2005 | Fano et al. | 235/383 |
| 2005/0289180 A1 | 12/2005 | Pabla et al. | |
| 2005/0289470 A1 * | 12/2005 | Pabla et al. | 715/751 |
| 2007/0067272 A1 | 3/2007 | Flynt et al. | |

(Continued)

FOREIGN PATENT DOCUMENTS

| | | |
|---|---|---|
| CN | 101359334 A | 2/2009 |
| WO | 2008032176 A2 | 3/2008 |

OTHER PUBLICATIONS

International search report and written opinion for corresponding international application No. PCT/FI2010/050832 dated Feb. 21, 2011, pp. 1-14.

(Continued)

*Primary Examiner* — Kieu Vu
*Assistant Examiner* — Blaine Basom
(74) *Attorney, Agent, or Firm* — Ditthavong & Steiner, P.C.

(57) ABSTRACT

Techniques for dynamically grouping items include determining context associated with each group comprising one or more items; and determining current context at a device. In response to determining that prompted prompt is presented for input to indicate an item, a suggested group is determined based on the current context at the device and relevance of a context associated with the suggested group. The suggested group is presented. In some embodiments, prompted prompt is presented to name a suggested group; and, in response, data indicating the suggested group is stored as a permanent group associated with the name. In some embodiments, relevance is determined for each item of a group. A group avatar is generated based on M images associated with the items that have the most relevance.

21 Claims, 14 Drawing Sheets

(56) References Cited

U.S. PATENT DOCUMENTS

| | | | |
|---|---|---|---|
| 2007/0177805 A1* | 8/2007 | Gallagher | G06F 17/30265 382/190 |
| 2007/0186183 A1 | 8/2007 | Hudson, Jr. | |
| 2007/0288456 A1 | 12/2007 | Aravamudan et al. | |
| 2008/0071771 A1 | 3/2008 | Venkataraman et al. | |
| 2008/0161059 A1* | 7/2008 | Kraft et al. | 455/566 |
| 2008/0307306 A1* | 12/2008 | Pettinati et al. | 715/711 |
| 2008/0313574 A1 | 12/2008 | Aravamudan et al. | |
| 2009/0089316 A1* | 4/2009 | Kogan et al. | 707/102 |
| 2009/0139127 A1* | 6/2009 | Southard | A47G 1/065 40/761 |
| 2009/0158200 A1* | 6/2009 | Palahnuk et al. | 715/781 |
| 2009/0234874 A1* | 9/2009 | Sylvain | G06Q 10/107 |
| 2009/0247112 A1 | 10/2009 | Lundy et al. | |
| 2009/0249198 A1* | 10/2009 | Davis et al. | 715/261 |
| 2009/0281991 A1 | 11/2009 | Huynh et al. | |
| 2009/0313555 A1 | 12/2009 | Stovicek et al. | |
| 2009/0327438 A1 | 12/2009 | Cheng et al. | |
| 2010/0105370 A1 | 4/2010 | Kruzeniski | |
| 2010/0115426 A1* | 5/2010 | Liu et al. | 715/757 |
| 2010/0156834 A1* | 6/2010 | Sangster | G06K 9/00677 345/173 |
| 2010/0287504 A1* | 11/2010 | Vance et al. | 715/811 |
| 2012/0191777 A1* | 7/2012 | Iwasaki | G06Q 10/10 709/204 |

OTHER PUBLICATIONS

Office Action for corresponding Chinese Application No. 201080060091.8 dated Dec. 16, 2013, with English language summary.

Office Action for corresponding Chinese Application No. 2010800600091.8, dated Aug. 20, 2014, 5 pages (English Language Summary Included).

Chinese Office Action corresponding to Chinese Patent Application No. 201080060091.8, dated Feb. 17, 2015, with English-language summary; 5 pages.

Office Action for corresponding Chinese Patent Application No. 201080060091.8 dated Aug. 14, 2015, with English-language summary, 6 Pages.

European Office Action for corresponding European Patent Application No. 10840628.1-1959, dated Jan. 21, 2016, 8 Pages.

* cited by examiner

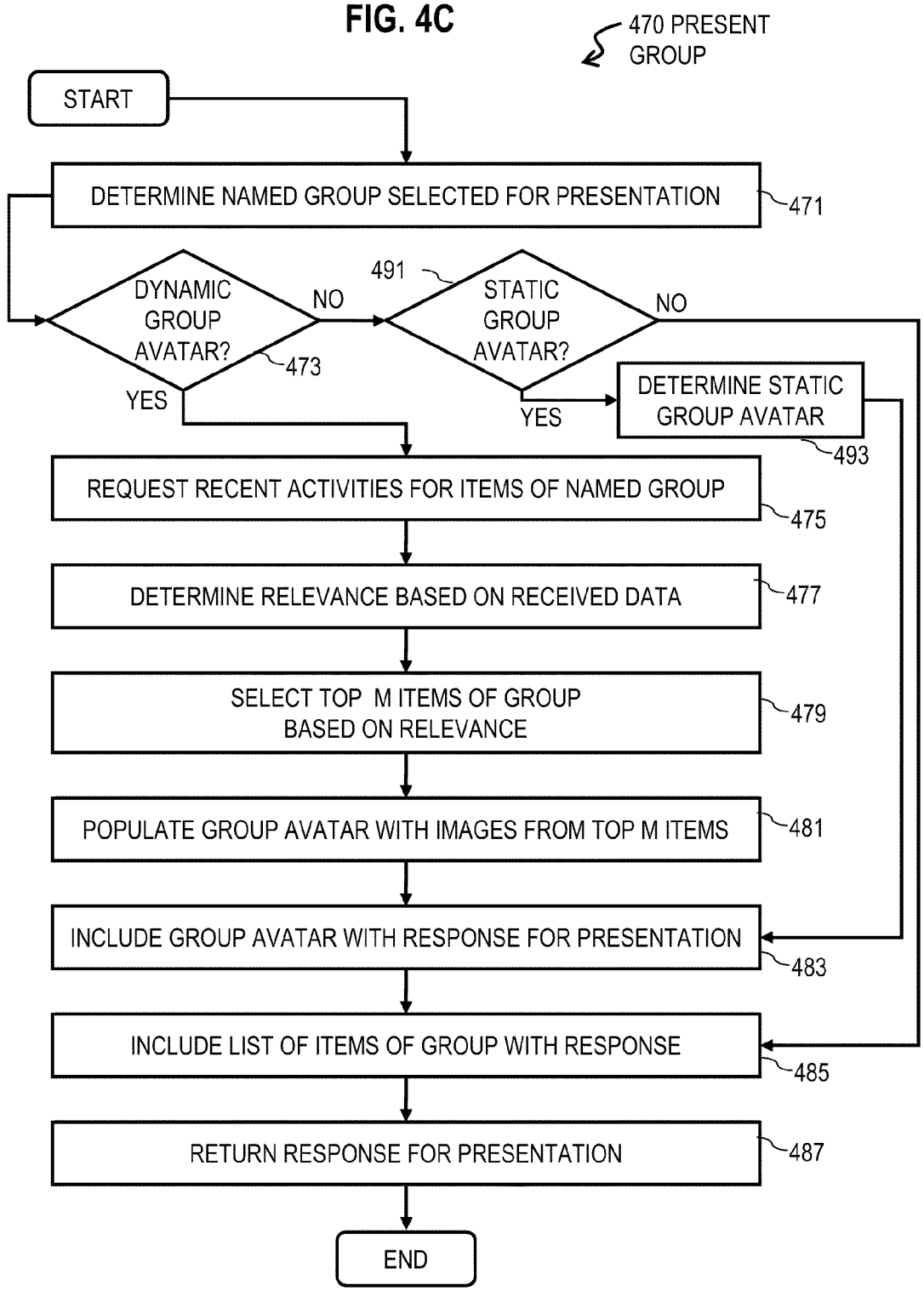

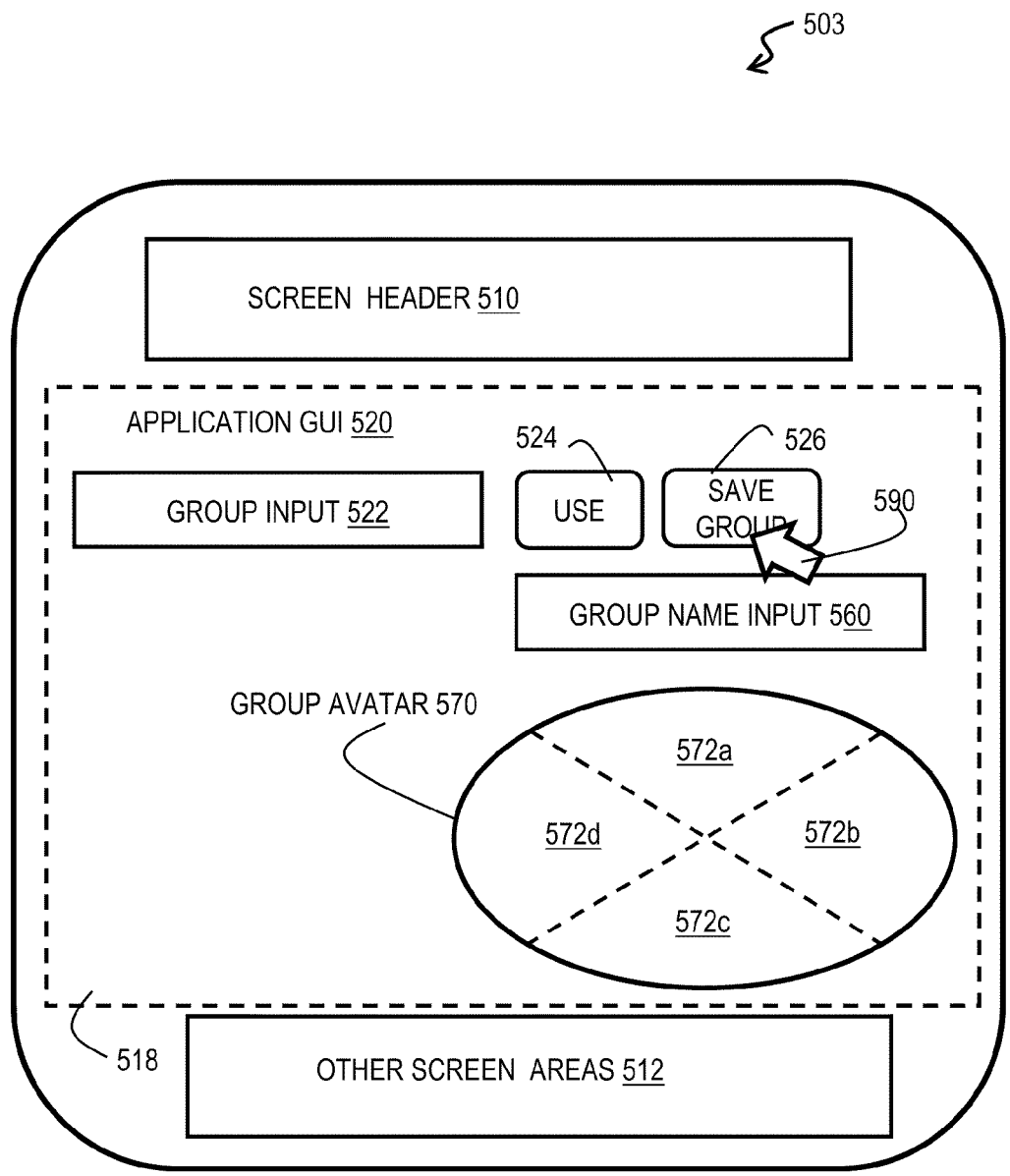

METHOD AND APPARATUS FOR DYNAMICALLY GROUPING ITEMS IN APPLICATIONS

BACKGROUND

On hand-held information processing devices, such as personal digital assistants (PDAs) and cellular telephones, a user is often prompted to enter a group of items, such as multiple contacts for an email or text or photo, or a shopping list of items (including groceries) to purchase, or a series of events or dates for a calendar. Usually, the user operates the hand-held device to cause the items on a source list to scroll across a display screen of limited size until one of the items of interest appears on the screen. The user then additionally operates the hand-held device to select the displayed item and add it to the group. These user operations often require that the user's eyes be focused on the display screen until both operations are completed several times and that at least one of the user's hands be continually occupied to operate the hand-held device. This can be dangerous when the user is engaged in other actions, such as walking, exercising, driving or operating equipment. Furthermore, such operations involve a local device consuming memory, processor and display screen resources to present and scroll the long lists. If the long lists are first communicated across a network, excessive network resources are also consumed.

Some Example Embodiments

Therefore, there is a need for an approach for quick identification of items for a group that does not consume so many device and network resources or require continuous hand and eye involvement. In various embodiments, techniques presented here allow groups for applications on device to be formed dynamically with less consumption of device display resources (and less consumption of supporting memory and processor resources) and fewer inputs by the user.

According to one embodiment, a method comprises determining context associated with each group comprising one or more items for a plurality of groups. The method also comprises determining current context at a device. The method also comprises, in response to determining that prompted prompt is presented for input to indicate an item, determining a suggested group of the plurality of groups based on the current context at the device and relevance of a context associated with the suggested group. The method also comprises causing the suggested group to be presented.

According to another embodiment, an apparatus comprises at least one processor, and at least one memory including computer program code, the at least one memory and the computer program code configured to, with the at least one processor, cause, at least in part, the apparatus to determine context associated with each group comprising one or more items for a plurality of groups. The apparatus is also caused to determining current context at the apparatus. The apparatus is also caused, in response to determining that prompted prompt is presented for input to indicate an item, to determine a suggested group of the plurality of groups based on the current context at the apparatus and relevance of a context associated with the suggested group. The apparatus is also caused to cause the suggested group to be presented.

According to another embodiment, a computer-readable storage medium carries one or more sequences of one or more instructions which, when executed by one or more processors, cause, at least in part, an apparatus to determining context associated with each group comprising one or more items for a plurality of groups. The apparatus is also caused to perform determining current context at the apparatus. The apparatus is also caused to perform, in response to determining that a prompt is presented for input to indicate an item, determining a suggested group of the plurality of groups based on the current context at the apparatus and relevance of a context associated with the suggested group. The apparatus is also caused to perform causing the suggested group to be presented.

According to another embodiment, an apparatus comprises means for determining context associated with each group comprising one or more items for a plurality of groups. The apparatus also comprises means for determining current context at the apparatus. The apparatus also comprises means for determining a suggested group of the plurality of groups based on the current context at the apparatus and relevance of a context associated with the suggested group in response to determining that a prompt is presented for input to indicate an item. The apparatus also comprises means for causing the suggested group to be presented.

In some embodiments, a method includes, or apparatus or computer readable medium are configured for, presenting a prompt to name a suggested group; and, in response, storing data indicating the suggested group as a permanent group associated with the name.

In some embodiments, a method includes, or apparatus or computer readable medium are configured for, determining relevance for each item of a group. A group avatar is generated based on a number M of images associated with a number M items that have the most relevance.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4C is a flowchart of a process for presenting a group of items, according to one embodiment;

FIGS. 5A-5E are diagrams of user interfaces utilized in the processes of FIG. 4A, FIG. 4B or FIG. 4C, according to various embodiments;

DESCRIPTION OF SOME EMBODIMENTS

Examples of a method, apparatus, and computer program for dynamically grouping items are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term avatar refers to a graphical image that can be presented on a display device and that represents a physical object or set of physical objects.

Although various embodiments are described with respect to selecting a group of contacts on a cellular telephone from a list of contacts, it is contemplated that the approach described herein may be used with other lists of items and devices, such as a list of grocery or shopping items, a list of events to be scheduled, or a list of purchase prices or telephone numbers to be selected, among others, on a variety of devices including cell phones, PDAs, or laptop or desktop computers, among others.

Figure 1:
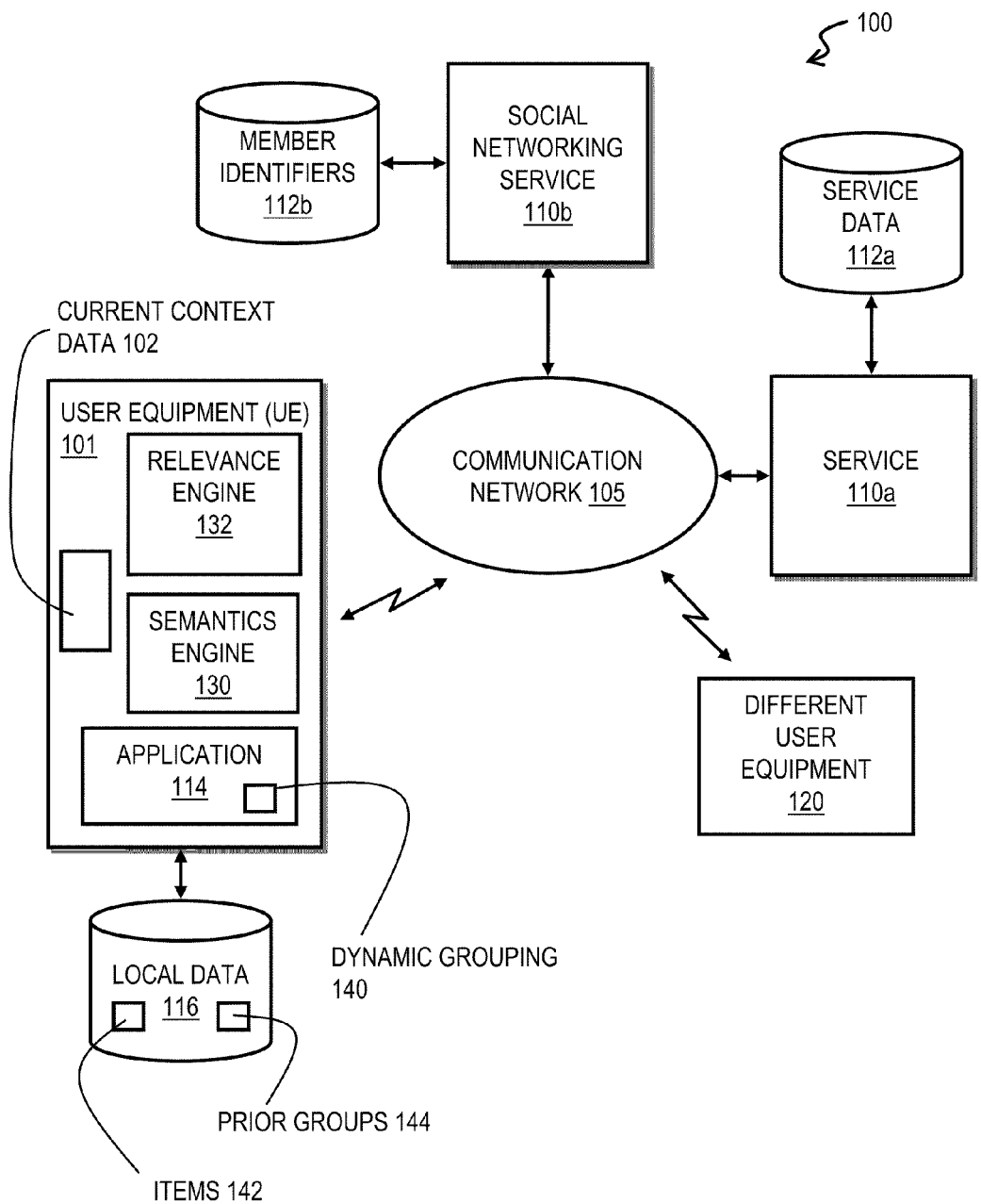
FIG. 1 is a diagram of a system capable of dynamic grouping of items, according to one embodiment.

FIG. 1 is a diagram of a system capable of dynamically grouping items, according to one embodiment. When a user of some device, called user equipment (UE) herein, wishes to select an item from a list, the list is presented to the user on a display screen of the user equipment from which an item is selected based on user input, e.g., by using a pointing device to indicate a portion of the display screen where the item is presented. If a group of items are needed, the user starts the process again, often forced to scroll again from the beginning of the list to the next item in the group. Often the user is allowed to define groups of items, but there are so many different combinations that a user may want over the course of a day or week, that it is tedious to predefine many, and unlikely that the user has done so. Furthermore, it is often impossible for a user to anticipate every group the user actually generates during a period of time, such as a day or a week. Thus the user must often define a group in the fly. While doing so, the user's hand is required to keep the list scrolling and indicate the next selection, while the user's eyes are involved to search for the item among the scrolling list; and then start over for the next item. This involvement might exceed the user's patience or capacity, especially while the user is engaged in other important or dangerous activity, such as driving a car. At the very least, the tedious, persistent involvement diminishes the user experience of the application requesting the group of items, such as an email client process.

To address this problem, the system 100 of FIG. 1 introduces the capability to allow automatically assisted dynamic group definitions or identification or both. The automatic assist comes as permanently storing, at the user's option, any group generated dynamically; or representing groups using an avatar made up of the most relevant members of the group; or dynamically suggesting the next one or more items of a group desired as input to a particular application using measures of relevance; or some combination. The number of pointing device operations, and corresponding user glances are kept near a minimum given the available context information. This approach is called dynamic grouping of items.

As shown in FIG. 1, the system 100 comprises a user equipment (UE) 101 having connectivity to network service 110a or social networking service 110b (collectively referenced hereinafter as service 110) or different user equipment 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. In other embodiments, the UE 101 is stand alone, such as a PDA without wireless communication capability; and network 105, services 110 and different user equipment 120 are omitted.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. The service 110a is a server that uses service data in service data structure 112a. Similarly, social networking service 110a is a server that uses member identifiers data in member identifiers data structure 112b.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 includes a display screen and pointing device, as described in more detail below with reference to a computer system depicted in FIG. 6 and mobile terminal in FIG. 8. Local data for UE 101 applications are stored on local data structure 116, such as a flash card or internal disk.

An application process 114 that uses a group of items selected from a list of items in items data structure 142 is executed on UE 101. For example, in some embodiments the application 114 is a personal information management (PIM) system that uses an ordered list of grocery items to buy, or a schedule of events for the coming months. In some embodiments, the application 114 is a client process communicating with a network service 110 across network 105, and the list in data structure 142 is downloaded, entirely or in part, from the service 110. For example, the list is downloaded from service data structure 112a of service 110 or member identifiers data structure 112b of social networking service 110b. In some embodiments, the service provides World Wide Web (WWW) pages in one or more messages sent using a Hypertext Transfer Protocol (HTTP) and the application 114 is a WWW client process called a browser. In some embodiments, the application is a telephone dialing process for connecting to other user equipment, such as different user equipment 120, and the list is a list of other users, called a contact list, whether ordered numerically by telephone number or alphabetically by contact name or unordered.

In the illustrated embodiment, the application 114 includes a dynamic grouping module 140 that provides dynamic grouping of items by suggesting the next item or group of items based on relevance to the current context at the UE 101 and past contexts associated with prior groups stored in prior groups data structure 144. The current context at the UE 101 is stored in one or more data structures represented by current context data structure 102. The meaning of text received at the UE is determined using a semantics engine 130 in the illustrated embodiment. The relevance to the current context at UE 101 of text and other context information associated with items and prior groups is determined by a relevance engine 132 in the illustrated embodiment. In some embodiments, the list selection module 140 is included in an operating system of the user equipment, e.g., UE 101. The application 114 sends the list to the module 140 in the operating system using an application programming interface (API) for the module 140 or a messaging protocol such as HTTP; and the module 140 controls the interaction with the user. The dynamic grouping module 140 is a means of achieving the advantages of automatically assisting in the identification and storage of groups of items for one or more applications with fewer display operations, thus saving resources on the device.

In the illustrated embodiments, the components of system 100 include dynamic grouping module 140, semantics engine 130, and relevance engine 132. It is contemplated that one or more functions of these components may be separated or combined in one or more components or performed by one or more other components of equivalent functionality, e.g., in a network service 110.

Although data structures 102, 142 and 144 are depicted as integral structures on UE 101, in other embodiments, one or more of these data structures, or portions thereof, are arranged in a different way on UE 101 or one or more other nodes of the network 105, including nodes of one or more services 110 or other user equipment 120.

Figure 2:
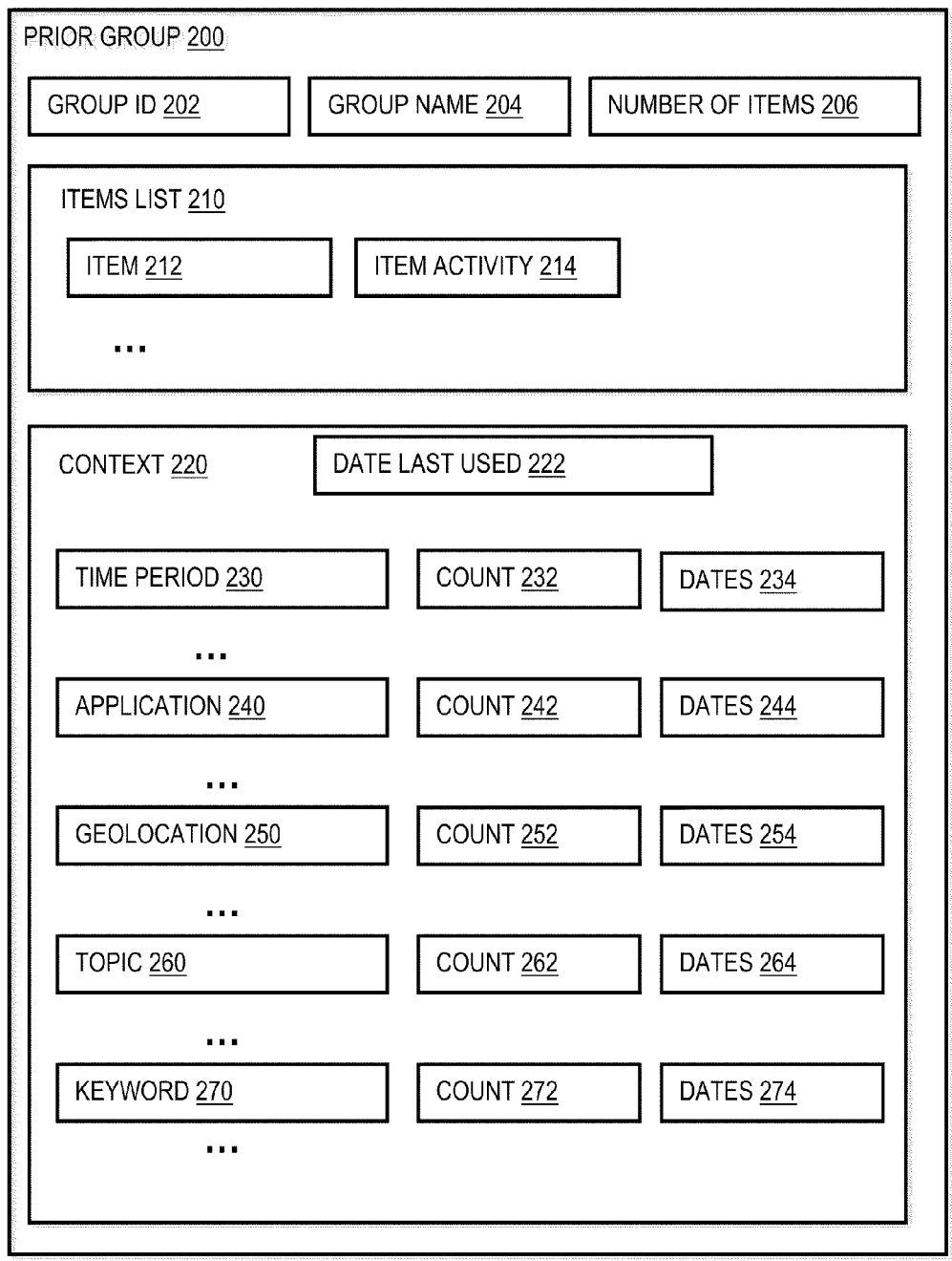
FIG. 2 is a diagram of an entry of a data structure for recording context of a previously defined group of items, according to one embodiment.

FIG. 2 is a diagram of an entry 200 of data structure for recording context of a previously defined group of items, according to one embodiment. The entry 200, called a prior group entry is one record in a prior groups data structure, such as prior groups data structure 144, and includes for each prior group, in the illustrated embodiment, a group identifier (ID) field 202, a group name field 204, a number of items field 206, an items list field 210 and a context field 220. In some embodiments, prior group entry 200 is maintained by the relevance engine 132 on UE 101 or node of service 110. Any relevance engine known in the art may be used, such as COLLARITY™ of Collarity, Inc. of Palo Alto, Calif., available as a service 110.

The group ID field 202 holds data that uniquely identifies the entry 200 on UE 101 or on the network. In some embodiments, the group ID field holds data that indicates the type of items in the group, e.g., whether items to be purchased, contacts, content to be rendered for human perception, events, or some other items to be grouped by an application. The number of items field 206 holds data that indicates the number of items in the prior group.

The group name field 204 holds data that indicates a user name for the group if any. Some groups are temporary and defined by a user as needed but not named for permanent storage and subsequent retrieval. In the illustrated embodiment, such temporary groups are tracked as a prior group entry 200 in a prior group data structure, such as prior groups data structure 144, but have no user assigned group name in field 204.

The items list field 210 includes, for each item in the group, an item field 212 and an item activity field 214. The item field 212 holds data that identifies the item, such as a name for the item or a catalog number for the item or a pointer to a separate database of items that provides additional information about the item, such as items data structure 142. The item activity field 214 holds data that indicates the activity of the item, such as an amount or date of a most recent price change for an item to be purchased, or the date of the most recent update of contact information for a contact, such as a most recent update to a social networking page of the contact. In some embodiments, item activity field 214 is included in the items data structure 142. In some embodiments, item activity field 214 is omitted.

Context field 220 holds data that indicates the past context or contexts associated with one or more former uses of the prior group. The past context information recorded here indicates the context at the UE 101 at each unexpired time that the prior group was used. It is the past context associated with such former use that is compared to the current context at the UE 101 to determine the relevance of the prior group to the current use of the application 114 by the user. Any context information that is considered useful for this purpose is included. In some embodiments, the relevance is determined using a few simple rules, such as a weighted sum of multiple factors, built into the module 140; and in some embodiments, the relevance is a sophisticated consideration of multiple factors as determined by relevance engine 132. Some former uses are considered too old to be relevant and are deleted from the context field 220 or given no weight. Therefore, in the illustrated embodiment, the date or dates of the former use is recorded in the context field 220.

In the illustrated embodiment, context field 220 includes a date last used field 220, and one or more fields indicating the distribution of former uses of the group in different time periods, applications, geolocations, and keywords and topics associated with text associated with a user during the former use of the group. These parameters represent the different components of relevance. A user of the UE 101 is inherently component of relevance with all these groups as well as the current context. Thus, context field 220 is an example means for defining context that comprises a set of values for a corresponding set of parameters including at least one of a user identifier for the user, a time period, an application executed on the device operated by the user, a network service communicating with the device operated by the user, a geolocation of the device, a keyword from a sample of text, a topic for the sample of text, or items in a group. In other embodiments more or fewer fields are included. An advantage of context field 220 is to allow a multi-dimensional assessment of relevance. This make it more likely that a relevant item or group is presented sooner in the process, thus saving display operations, and any supporting display, memory and processor resources on the device.

Time period field 230 holds data that indicates time period context, e.g. a time of day such as "morning" "afternoon," or "evening" on a "workday," a "weekend" or "holiday" when the group was used in the past. In some embodiments, the time period also indicates a date range, such as 2009 or January 2009, so that older uses of the prior group can be given less weight, ignored or deleted. The count field 232 holds data that indicates how many times the group was used in the time period identified in field 230. In some embodiments, in which the time period field 230 does not include a date range, dates field 234 is included. Dates field 234 holds data that indicates the dates associated with the former uses, one date for each count indicated in the count field 232. Data in the dates field 234 is used to eliminate counts associated with uses considered too old for an application. Other sets of time period, count and dates fields are indicated by the ellipsis below time period field 230.

Application field 240 holds data that indicates an application in which the group was used, such as application 114 or another application, such as a different email, instant messaging or social network client process or the service, such as service 110, with which a client process is communicating. For example, the last few times the user included contacts "Alice" and "Bob" in the same destination, it was in an instant messaging process, and the application field 240 indicates the instant messaging process. The count field 242 holds data that indicates how many times the group was used for the application identified in field 240. In some embodiments, dates field 244 is included for holding data that indicates the dates associated with the former uses in the application indicated in field 240, one date for each count indicated in the count field the ellipsis below application field 240.

Geolocation field 250 holds data that indicates a geographic location where the UE (e.g., UE 101) was located when the group was used. Any method may be used to indicate the geolocation, such as latitude and longitude coordinates, a postal address, a communications network address (e.g., a uniform resource locator, URL, name), a name of a point of interest, or a reference to a database of points of interest where more information about the geolocation is stored. For example, the last few times the user included contacts "Alice" and "Bob" in the same destination, it was while the user was at a particular coffee house, and the application field 240 indicates the street address of the particular coffee house. The count field 252 holds data that indicates how many times the group was used at the location identified in field 250. In some embodiments, dates field 254 is included for holding data that indicates the dates associated with the former uses at the geolocation indicated in field 240, one date for each count indicated in the count field 252. Other sets of geolocation, count and dates fields for different geolocations are indicated by the ellipsis below geolocation field 250.

Topic field 260 holds data that indicates a topic in text associated with the group. A topic is deduced from text using any method known in the art, such as a semantics engine of the APACHE LUCENE open source search engine from The Apache Software Foundation incorporated in Delaware. A topic is often deduced from the most frequently used keywords in a sample of text, where keyword are unusual words that distinguish samples of text from each other. Any method may be used to associate text with the group, such as text in a subject line or body of an email or other message sent to the group, text in an email or other message most recently received before the group was used in an application, or in a document open at the time the group was used in an application different from a process operating on the document. For example, the last few times the user included contacts "Alice" and "Bob" in the same destination, it was associated with message having a topic of "birthday." The count field 262 holds data that indicates how many times the group was used in association with text having a topic identified in field 260. In some embodiments, dates field 264 is included for holding data that indicates the dates associated with the former uses in association with the topic indicated in field 260, one date for each count indicated in the count field 262. Other sets of topic, count and dates fields for different topics are indicated by the ellipsis below topic field 260.

Keyword field 270 holds data that indicates a keyword from text associated with the group, wherein the keyword was not deemed to indicate a topic of the text. As described above, any method may be used to associate text with the group. The count field 272 holds data that indicates how many times the group was used in association with text having a keyword identified in field 270. In some embodiments, dates field 274 is included for holding data that indicates the dates associated with the former uses in association with the keyword indicated in field 260, one date for each count indicated in the count field 272. Other sets of keyword, count and dates fields for different keywords are indicated by the ellipsis below keyword field 270.

An advantage of including counts and dates is to assess comparative relevance of several groups. For example, it is assumed for purposes of illustration that one prior group of contacts included only Alice and Bob but that group has only been encountered three times in the past year, the most recent ten months earlier. It is further assumed for purposes of illustration that, in contrast, another group that includes Alice and Bob and Charles has been encountered 20 times in the last year with ten of those in the most recent month. Clearly the latter group is more relevant than the former group for the current context. Thus count fields 232, 242, 252, 262 and 273, and dates fields 234, 244, 254, 254 and 274 are example means to achieve the advantage of improved assessment of comparative relevance. This make it more likely that a relevant item or group is presented sooner in the process, thus saving display operations, and any supporting display, memory and processor resources on the device.

In some embodiments, an expiration age is determined for each parameter, e.g., each component of relevance. The expiration age is stored with data that defines the parameters, such as in the source instructions or an associated data structure. In some embodiments, the expiration age is a constant, e.g., one year. In some embodiments, a count beyond the expiration age is considered irrelevant. In some embodiments, the relevance also has a "decay" factor that reduces the relevance ranking over time so that the influence of an item on relevance is gradually reduced over time until the influence becomes negligible. This relationship is expressed by Equation 1.

$$\text{relevance} = (1/t) * v \qquad (1)$$

where t=time period since creation of object or since it was last "touched" and v=factor value for service (i.e. email messages to me have a higher factor value than email messages where I'm on the carbon copy line).

To determine the age of a count, the birth date of each count, e.g., the date the count was entered, is kept in the dates fields 234, 244, 254, 264, 274. Counts beyond the expiration age are removed from the count in the count field, and the corresponding data is removed from the dates field. An advantage of this approach is to avoid having determinations of relevance be controlled by very old occurrences. The dates fields and expiration ages are example means for achieving this advantage. This make it more likely that a relevant item or group is presented sooner in the process, thus saving display operations, and any supporting display, memory and processor resources on the device.

Figure 3:
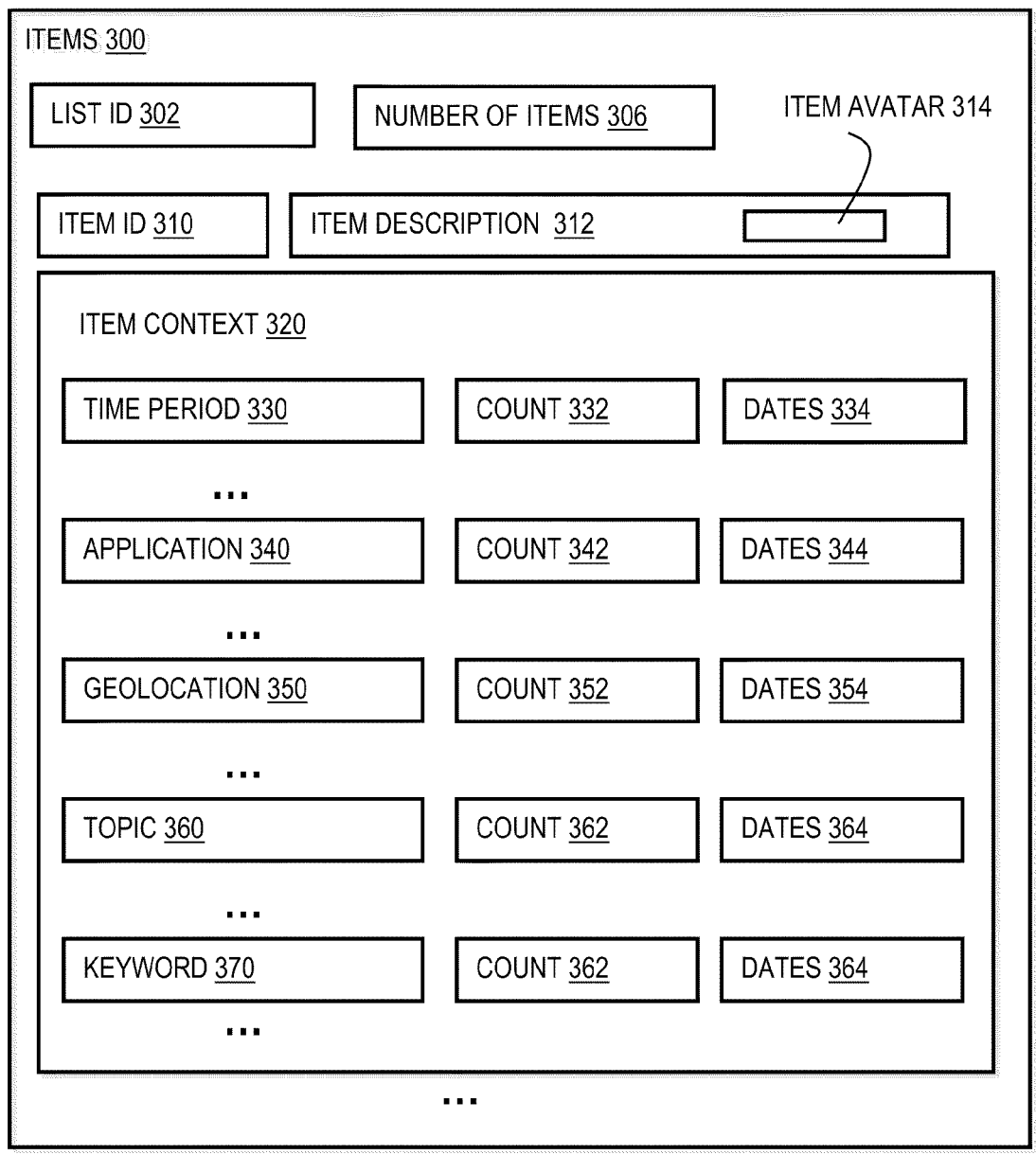
FIG. 3 is a diagram of a data structure for recording context of items in a list of items, according to one embodiment.

While context is associated with a group of items in prior group data structure 144, context is also associated with individual items in items data structure 142, in some embodiments. FIG. 3 is a diagram of a data structure 300 for recording context of items in a list of items, according to one embodiment. Data structure 300 is an embodiment of items data structure 142. The items data structure 300 includes a list identifier (ID) field 302, a number of items field 306, and, for each item, an item identifier (ID) field 310, an item description field 312, and an item context field 320. Other sets of item ID, item description and item context fields for different items are indicated by the ellipsis below context field 320. In some embodiments, non-permanent items are added based on user input with a code or null value in the description field 312 to indicate a non-permanent item. In some embodiments, item description field includes item avatar field 314 which holds data that indicates an image for the item that can be used as an avatar for the item or for a group that includes the item.

Item context field 320 holds data that indicates the context or contexts associated with one or more former uses of the item. The context information recorded here indicates the context at the UE 101 at each non-expired time that the item was used. It is the context associated with such former use that is compared to the current context at the UE 101 to determine the relevance of the item to the current use of the application 114 by the user. Any context information that is considered useful for this purpose is included.

In the illustrated embodiment, similar fields are included in item context field 320 as in group context field 220. In this embodiment, the item context field 320 is an embodiment of the group context field 220 for a group of one item. In the illustrated embodiment, item context field 320 includes one or more fields indicating the distribution of uses in different time periods, applications, geolocations, and keywords and topics associated with text for a user during the former use of the item. One or more time periods for prior use of the item are indicated by one or more sets of time period field 330, count field 332 and dates field 334 and ellipsis. The contents of these fields are parallel to the contents described above for fields 230, 232 and 234, respectively, but appropriate instead for the item and not the group. Context field 320 is an example means for defining context that comprises a set of values for a corresponding set of parameters including at least one of a user identifier for the user, a time period, an application executed on the device operated by the user, a network service communicating with the device operated by the user, a geolocation of the device, a keyword from a sample of text, a topic for the sample of text.

Similarly, one or more applications of prior use of the item are indicated by one or more sets of application field 340, count field 342 and dates field 344 and ellipsis. Similarly, one or more geolocations of prior use of the item are indicated by one or more sets of geolocation field 350, count field 352 and dates field 354 and ellipsis. Similarly, one or more topics of text associated with prior use of the item are indicated by one or more sets of topic field 360, count field 362 and dates field 364 and ellipsis. Similarly, one or more keywords of text associated with prior use of the item are indicated by one or more sets of keyword field 370, count field 372 and dates field 374 and ellipsis. The contents of these fields are parallel to the contents described above for corresponding fields in context field 220, but appropriate instead for the item and not the group.

Although fields in FIG. 2 and FIG. 3 are shown as integral portions of particular data structures for purposes of illustration, in other embodiments, one or more of these fields, or portions thereof, are omitted or arranged in a different way on the same or different data structures on UE 101 or one or more other nodes of the network 105, including nodes of one or more services 110 or other user equipment 120, or one or more additional fields are added.

Figure 4A:
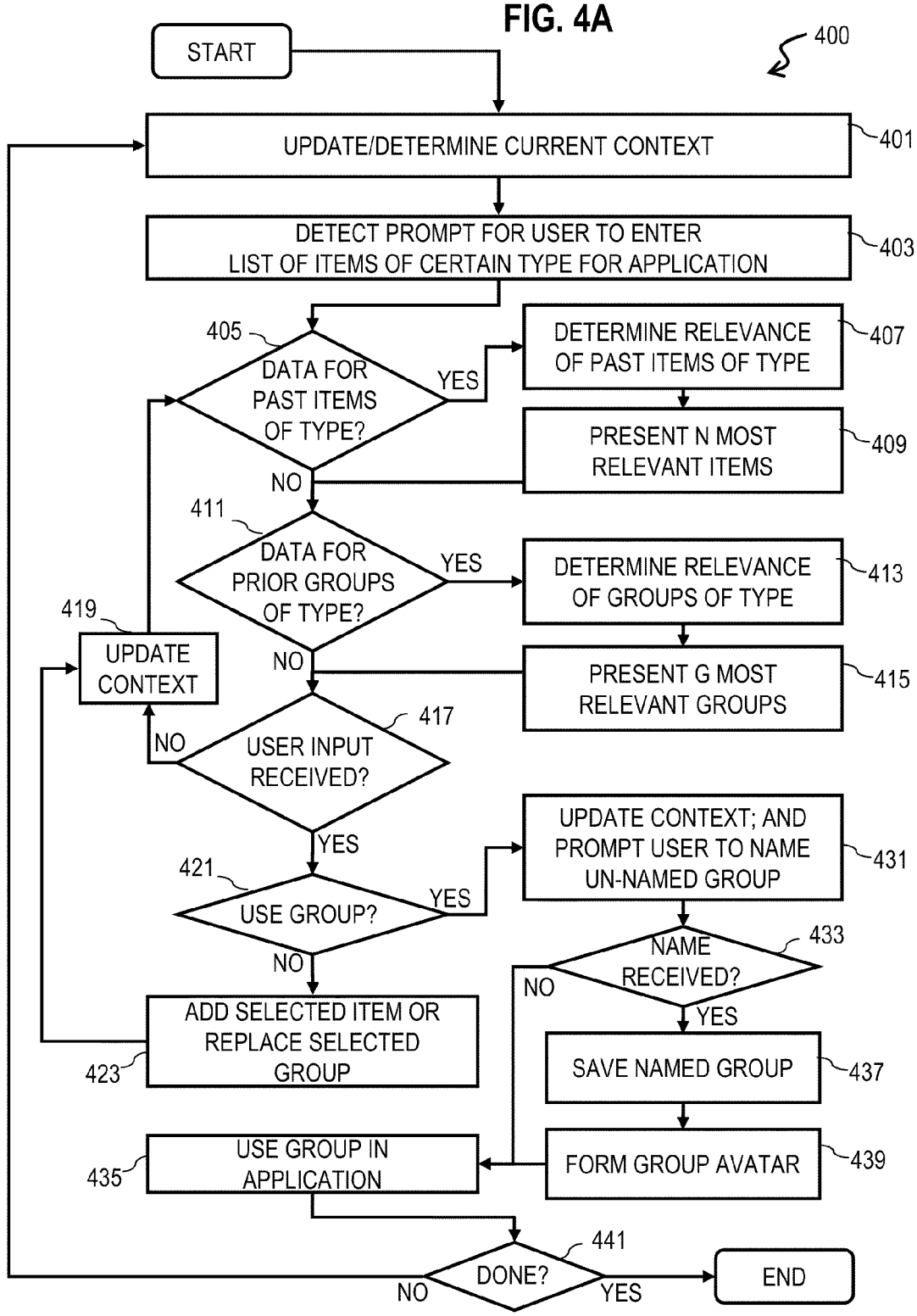
FIG. 4A is a flowchart of a process for dynamic grouping of items, according to one embodiment.

FIG. 4A is a flowchart of a process 400 for dynamically grouping items, according to one embodiment. In one embodiment, the dynamic grouping module 140 performs the process 400 and is implemented in, for instance, a chip set including a processor and a memory as shown FIG. 7. In some embodiments, one or more steps are performed by different components of system 100 of similar functionality. Although steps are shown in FIG. 4A, and subsequent flow diagrams FIG. 4B and FIG. 4C, in a particular order for purposes of illustration, in other embodiments one or more steps, or portions thereof are performed in a different order or overlapping in time, performed in series or parallel, or one or more steps are omitted or one or more other steps are added, or the process is changed in some combination of ways.

In step 401 the current content is determined, including updating any fields in the data structures 102 that hold the current context data. The current context information includes, user information, manufacturer and model of UE 101, operating system on UE 101, date, time period, geolocation, other sensor data (e.g., from accelerometers, altimeters, gyroscopes, light sensors, microphones, cameras), current visual elements on a display, open applications, network conditions (e.g., connected, bandwidth, noise), current content being rendered, recent text received, recent text typed by the user, keywords of the recent text, topics of the recent text, contacts currently in communication, or contacts recently in communication, alone or in any combination. Any method known in the art may be used to determine the current context, including keystroke tracking, data bus monitoring, operating system interrupt processing, or polling modules installed on the device, alone or in some combination. Thus current context at a device operated by a user is determined.

In some embodiments, step 401 includes updating the context fields of one or more items or one or more groups. For example, expired counts beyond the expiration age, and corresponding dates, in context field 330 or item context field 320 are removed. Context updates are described in more detail below as process 450 depicted in FIG. 4B.

In step 403, a prompt presented to the user to enter a list of items is detected. In some embodiments, the application 114 issued the prompt and initiates operation of the dynamic grouping module 140. In some embodiments, the dynamic grouping module tracks forms presented to the user, e.g., in a web page, for receiving input, and determines when the user has selected, using a pointing device such as a mouse or touchscreen, a field in the form for receiving input that indicates a group of items. This field, usually in a graphical user interface (GUI) is called the group input area. The type of the group of items to list is also determined, e.g., whether a contact, a purchase item or a timed event, using any method known in the art. For example, the field to track a type of item is indicated in source code or provided by a separate process or provided by the application 114 itself to the dynamic grouping module 140 using an API for the module 140. This is an example means for determining that the user is prompted for input to indicate an item. An advantage of this approach is it allows the dynamic grouping of items to be made available to extant applications that use standard forms for receiving user input.

Figure 4B:
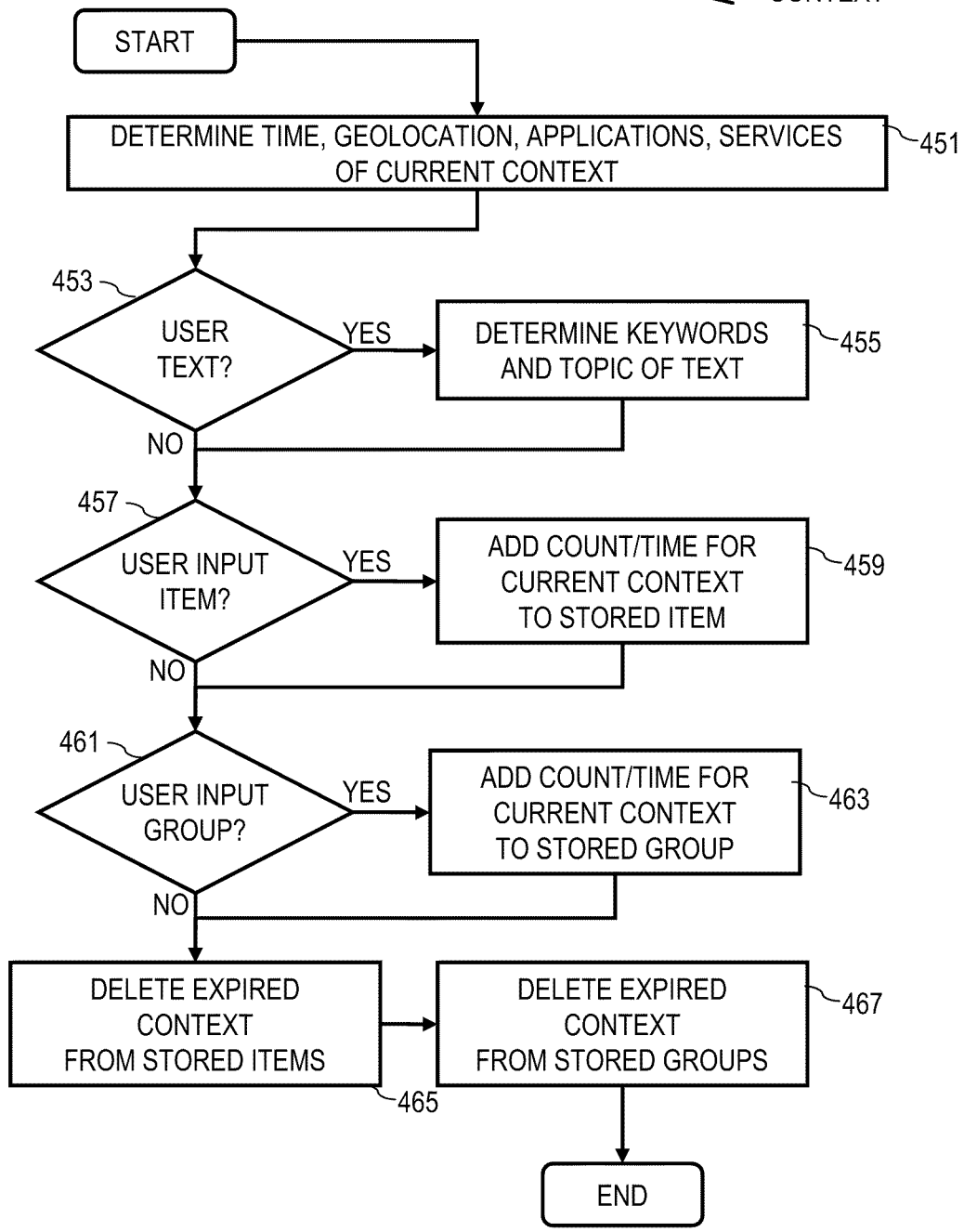
FIG. 4B is a flowchart of a process for updating group context, according to one embodiment.
Figure 5A:
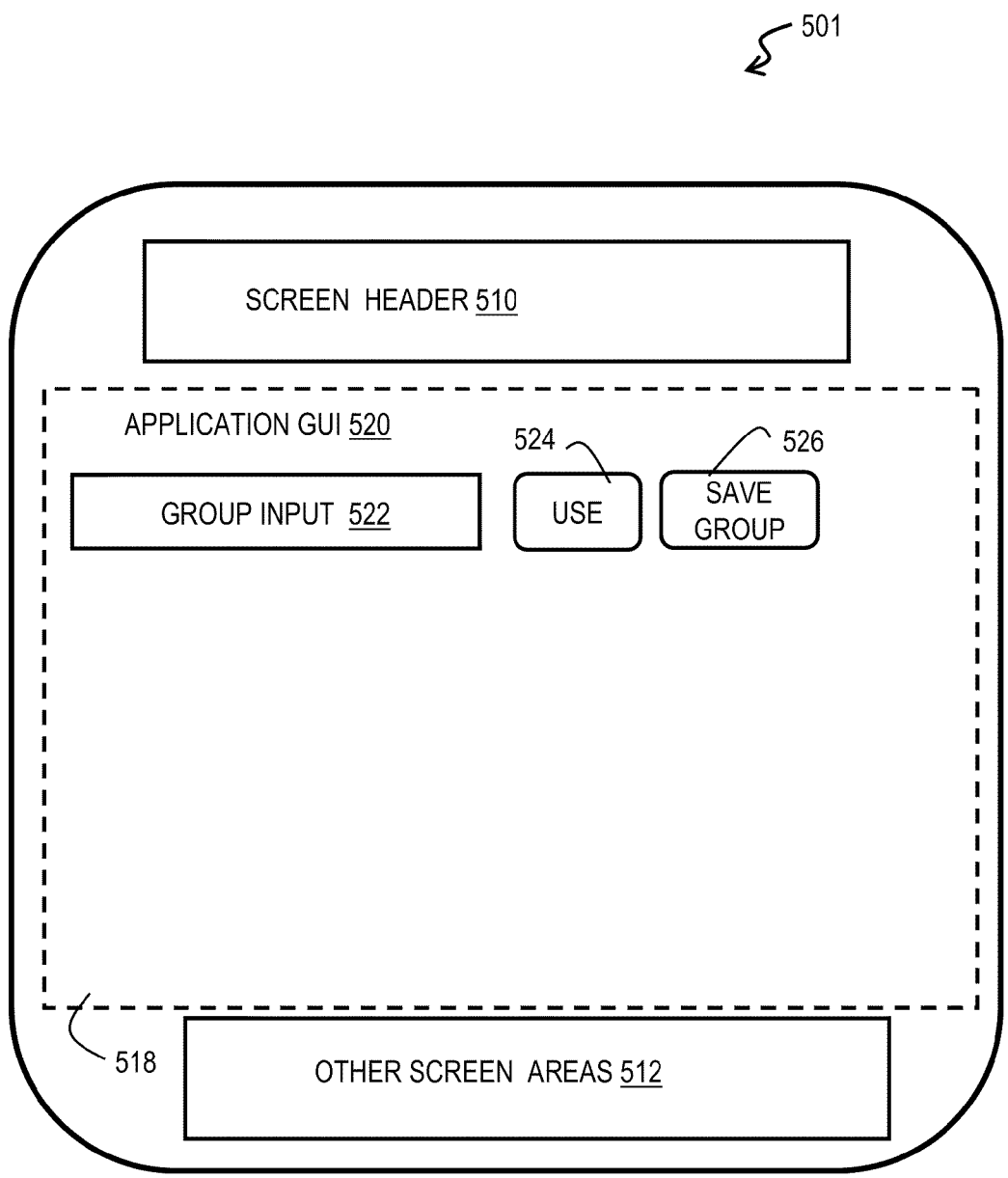

FIGS. 5A-5E are diagrams of user interfaces utilized in the processes of FIG. 4A, FIG. 4B or FIG. 4C, according to various embodiments. FIG. 5A is a diagram of a graphical user interface 501 presented on a display of user equipment, e.g., UE 101, according to an embodiment. The GUI 501 includes a screen header area 510 and other screen areas 512 and application area 518. The operating system of the user equipment usually reserves the screen header area 510 and populates it with visual content used to control the device; and allocates other areas 512 of the display screen to various applications executing on the device. In the illustrated embodiment, the operating system has allocated to application 114 the application area 518, or allowed the application 114 to claim the area 518. In the illustrated embodiment, the application area 518 includes a group input area 522, a use button 524 and a save group button 526.

The group input area is where a user is to input data indicating multiple items for a group, e.g., a group of groceries to order online, or a group of contacts to whom a message is to be sent. For example, in some embodiments, the group input area 522 is one or more fields of a hypertext markup language (HTML) forms page sent in one or more HTTP messages to application 114 from a service 110 on the network 105 or from another process on UE 101. The user inserts items into the group input area 522 by operating a pointing device to indicate the area, e.g., by moving a mouse over the area or touching the area on a touch screen. When the user indicates the input area 522, the dynamic grouping module 140 is invoked to control the use of groups. GUI 501 and group input area 522 is an example means for the user being prompted to indicate an item.

The use button is activated by user, again by operating a pointing device, to use the group of items indicated in group input area 522 as input to the application 114, e.g., as input to a grocery shopping application or an email application.

The save group button is activated by a user, again by operating a pointing device, to save the group of items indicated in group input area 522 as a permanent, named group.

In some embodiments, the dynamic grouping module 140 controls the presentation of the use button 524 and save group button 526, when one or more items are indicated in group input area 522. In some embodiments, the use button 524 and save group button 526 are presented by the application 114 to independently invoke separate modules that perform the functions associated with these buttons.

In step 405, it is determined whether there is past context data stored for items of the type to be input. If so, then in step 407, the relevance of the items of that type are determined based on the current context and the past context. In some embodiments, step 407 includes determining keyword and topics of recent text included in the current context, e.g. using semantics engine 130. In some embodiments, step 405 includes updating the context fields of one or more items in items data structure 300 (e.g. items data structure 142). For example, expired counts, and corresponding dates, in item context field 320 are removed before determining the relevance of the item in light of the current context.

The relevance can be expressed in any method known in the art. For example, in some embodiments, a relevance metric is determined based on a weighted sum of the number of matches between one or more data fields representing the current context and corresponding fields in item context field 320. One or more of the corresponding fields that do not hold past context information for a particular item do not contribute to the weighted sum for that item. In some embodiments, more recently used items are given more weight. In some embodiments a more sophisticated relevance engine (e.g., relevance engine 132) is used. For example, one or more data fields representing the current context are sent to the relevance engine 132 along with corresponding fields from the item context field 320, and the relevance engine 132 returns a relevance metric, such as a percent likelihood that the item would be considered relevant. This is a means for determining a suggested item of the plurality of items based on the current context at the device and relevance of a context associated with the suggested item.

In step 409 some of the most relevant items, if any, are caused to be presented on a display of the user equipment (e.g., UE 101). In the illustrated embodiment, only up to a number N of the most relevant items are presented. Where N is a number of items that reasonably fit on a display device at substantively the same time. In some embodiments the most relevant items are presented in order of decreasing value of the relevance metric. In some embodiments only items with a value of the relevance metric over a threshold value, up to N items at most, are presented.

Figure 5B:
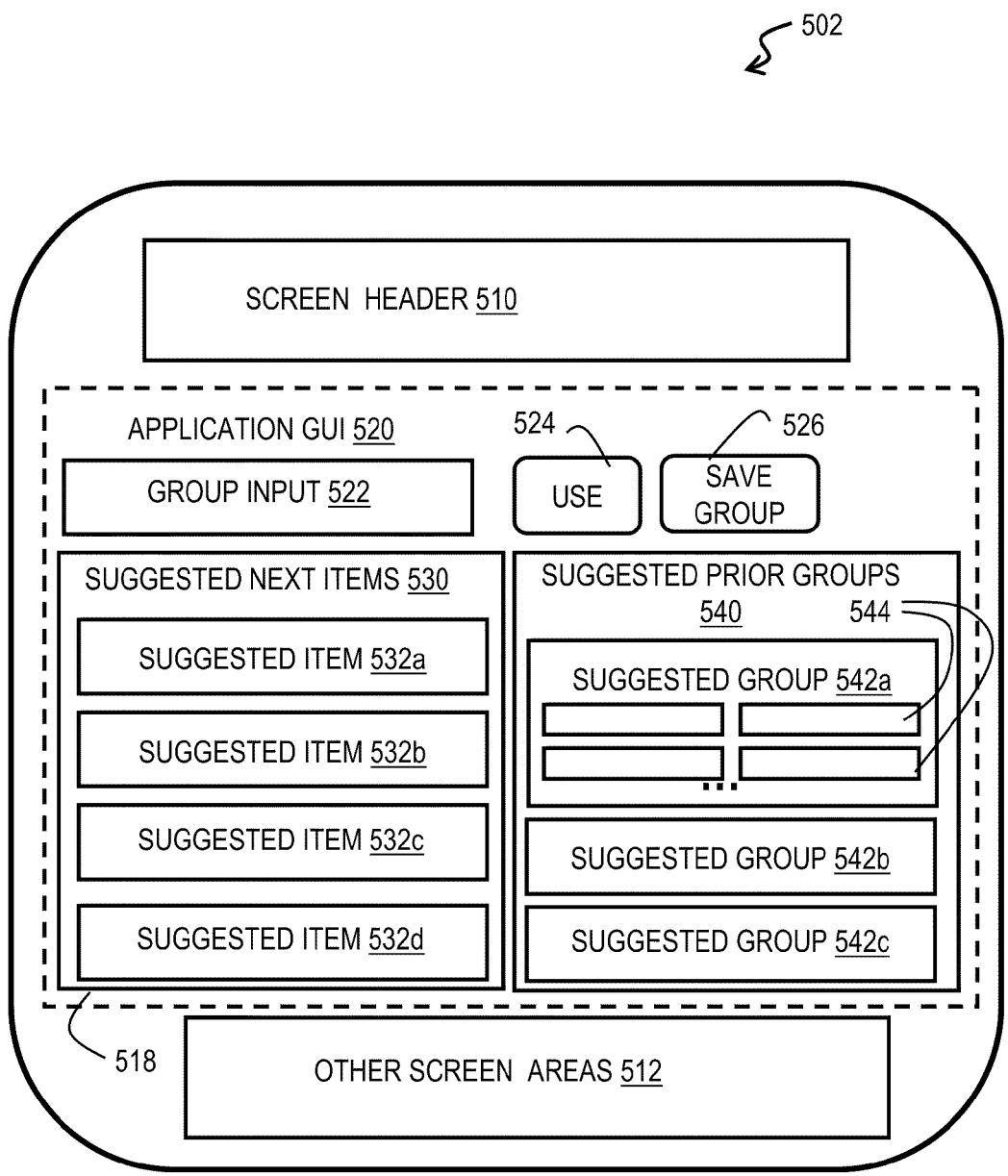

As described herein, in some embodiments, the dynamic grouping module 140 suggests one or more items to include in the group input area 522 based on the current context of the user equipment and the past contexts associated with items and previously used groups in data structures 142 and 144, respectively. In these embodiments, when the user has operated a pointing device to indicate the group input area 522, one or more relevant items or prior groups are determined and presented to the user as suggested next items or suggested prior groups. FIG. 5B is a diagram of a graphical user interface 502 presented on a display of user equipment, e.g., UE 101, according to an embodiment. The application area 518 now includes not only the group input area 522, use button 524 and save group button 526 described above with respect to GUI 501, but also a suggested next items area 530 and a suggested prior groups area 540.

The suggested next items area 530 includes zero or more suggested item areas, such as suggested item area 532*a* through suggested item area 532*d*, collectively referenced hereinafter as suggested item areas 532. GUI 502 and suggested items area is an example means for causing the suggested item to be presented for the user to select the suggested item in response to being prompted for the input.

In some embodiments, the most relevant items are not presented, only the most relevant groups of more than one item; and, in some of these embodiments step 405 through step 409 are omitted; and suggested next items area 530 is also omitted.

Returning to FIG. 4A, in step 411, it is determined whether there is past context data stored for groups of items of the type to be input. If so, then in step 413, the relevance of the groups of items of that type are determined based on the current context and the past context for those groups. In some embodiments, step 411 includes determining keyword and topics of recent text included in the current context, e.g. using semantics engine 130. In some embodiments, step 413 includes updating the context fields of one or more groups in prior groups data structure data structure 144. For example, outdated counts, and corresponding dates, in group context field 220 are removed before determining the relevance of the group in light of the current context.

The relevance is determined based on one or more data fields representing the current context and corresponding fields in group context field 220, using any means to compute relevance, such as a weighted sum of counts, or a more sophisticated relevance engine (e.g., relevance engine 132), as described above for item relevance. In some embodiments, the relevance of groups is also based on the items list field 210 and item already entered by a user in response to the prompt detected in step 403, described above. For example, if a user has already entered Alice in an email addressee list, then groups that include Alice are given more weight than other groups. Similarly more weight is given to groups that include all the names that a user has entered (by typing or selecting previously presented items or groups). Thus if the user has typed both Bob and Alice as contacts, then more weight is given to groups of contacts that include both Alice and Bob over groups that include only one. This is an example means for determining a suggested group of the plurality of groups based on the current context at the device and relevance of a context associated with the suggested group, In step 415, some of the most relevant groups, if any, are caused to be presented on a display of the user equipment (e.g., UE 101). In the illustrated embodiment, only up to a number G of the most relevant groups are presented, where G is a number of groups that reasonably fit on a display device at substantively the same time (with or without a number N of most relevant items). In some embodiments the most relevant groups are presented in order of decreasing value of the relevance metric. In some embodiments only groups with a value of the relevance metric over a group threshold value, up to G groups at most, are presented. In some embodiments, the names or avatars of items already entered by the user are highlighted in the groups listed. This is an example means for causing the suggested group to be presented for the user to select the suggested group in response to being prompted for the input.

Referring to FIG. 5B, the suggested prior groups area 540 includes zero or more suggested group areas, such as suggested group area 542a through suggested group area 542c, collectively referenced hereinafter as suggested group areas 542. GUI 502 and suggested prior groups area is an example means for causing the suggested group to be presented for the user to select the suggested group in response to being prompted for the input.

In some embodiments, one or more groups in a suggested group area 542 are presented as one or more individual items included in each group, such as individual item indictors 544 in suggested group area 542a. In some embodiments, one or more groups in a suggested group area 542 are presented as a static group avatar or user-given name for a permanent group. In some embodiments, one or more groups in a suggested group area 542 are presented as a dynamic avatar comprised of multiple images representing the M most relevant items, as described in more detail below with reference to FIG. 4C.

A user can add a suggested item to the items in the group input area 522 by operating the pointing device to indicate the corresponding suggested item area 532. A user can replace the items in the group input area 522 with a suggested group by operating the pointing device to indicate the corresponding suggested group area 542. After making such a selection, the current context may be altered, and the most relevant items and prior groups presented in the suggested next items area 530 and suggested prior groups area 540, respectively, may be updated to reflect the revised context, as shown in steps 419, 405, 407, 409, 411, 413 and 415 of process 400, described below.

When the group input area 522 is populated with the precise group desired by the user, the use button is activated by operating the pointing device, e.g. by clicking a physical button on a mouse when a cursor is positioned over the button 524, or touching the use button 524 on a touch screen. In response, the items indicated in the group input area are sent to the application, e.g., to complete the grocery shopping list sent to a an online grocery service or to send the email to the group of contacts Returning to FIG. 4A, in step 417, it is determined whether user input is received, e.g., selecting one of the presented items or groups or typing in some other input in response to the prompt (such as in the input form). If not, then in step 419, the current context or data structures of past context, or both, are updated. For example, the current context time period is changed (e.g., from morning to afternoon) or geolocation changed (e.g., from coffee shop to bank). In some embodiments, step 419 includes updating the context field 220 of group entry 200 one or more groups in prior groups data structure (e.g., data structure 144) or the context field 320 of one or more items in items data structure 300 (e.g., in data structure 142), as described in more detail below with reference to FIG. 4B. For example, expired counts, and corresponding dates, in group context field 220 or item context field 320 are removed. Control passes back to step 405.

If it is determined in step 417 that user input is received, then in step 421, it is determined whether the input indicates the user will use the group in its present form (e.g., the user has activated the use button 524 depicted in FIG. 5B. If so, control passes to step 431 and following described in more detail below to use the group in the application.

If, instead, it is determined in step 417 that the input indicates the user has selected a suggested item or group, then in step 423, the selected item or group is taken as the current user input in response to the prompt. For example, a selected item is added to any items already in the input form, or a selected group is used in place of the any items previously in the input form. Control passes back to step 419 to update the context. In some embodiments, in step 419 the count is incremented and the current date is added to the dates field of the time period, geolocation, application, topic and keywords of the current context for the selected item or group. In some embodiments, the counts in context fields 220 or 320 for selected items or groups, respectively, are not incremented unless and until the user indicates the items in the input form are to be used, as determined in step 421.

If the group is to be used, then in step 431 the context for the group and the items in the group are updated by incrementing the appropriate count fields in the context fields for the selected group and items. More detail about the updating of context is described below with reference to FIG. 4B.

In step 431, the user is also prompted to name the group, if the group is not already named, to make it a permanent group. For example, when the user operates the pointing device to select the save group button 526, the user is prompted for a name for the group. FIG. 5C is a diagram of a graphical user interface 503 presented on a display of user equipment, e.g., UE 101, according to an embodiment. The application area 518 now includes not only the group input area 522, use button 524 and save group button 526 described above with respect to GUI 501, but a group name input area 560 that appears when, for example, a cursor 590 is positioned over the button 526 using a mouse or trackball or arrow keys, or when a user touches button 526 on a touch screen. In some embodiments, a group avatar 570 is generated and presented when the save group button 526 is selected, for example using the process 470 depicted in FIG. 4C.

In response to being presented with group name input area 560, the user enters one or more characters in the group name input area 560 to name the group. Thus group name input area 560 is an example means for causing to be presented a prompt that requests a name for the suggested group. The group is saved as a permanent group with the given name. Thus, in response to receiving a name for the suggested group, data indicating the suggested group is stored as a permanent group associated with the name received. The prompt for a name for a group is a means to achieve the advantage of easily defining new permanent groups on the fly as they are generated manually by a user or worth one or more automatically generated suggestions. This make it more likely that important group is saved without requiring additional input to define it again later, after several manual entries. Thus a permanent group is defined sooner in the process, thus saving manual input/output and associated display operations, and any supporting display, memory and processor resources on the device.

Returning to FIG. 4A, in step 433, it is determined whether a name is input by the user for the group. If not, then the group is a non-permanent group; and is used in step 435 in the application that presented the prompt to the user to input a group of one or more items. For example, an email is sent to all contacts in the non-permanent group. An advantage of this approach is not requiring the user to name a group that the user does not expect to employ again. This saves permanent storage resources. The separate use button and save group button is a means to achieve this advantage, because the user can use a dynamically generated group without saving it as a permanent group by pressing the use button and skipping the save group button.

If it is determined, in step 433, that a name is input by the user for the group, then, in step 437 the group is saved as a permanent group with a name.

In step 439 a group avatar is formed. Any method may be used to form a group avatar, such as using an image associated with a member of the group. In some embodiments, a group avatar is automatically generated with multiple images representing corresponding items of the group, up to a number M of images. In some embodiments, a dynamic group avatar is generated based on the M most relevant items in the group, as described in more detail below with reference to FIG. 4C. In some embodiments, the dynamic group avatar is generated based on the M most recently active items in the group, as determined by the item activity field 214 of the prior group entry 200. Thus, in some embodiments, item relevance within a group is heavily weighted by the value in the item activity field 214. For example, a group avatar is generated by making a collage of images representing the M contacts who most recently updated their social networking page, or the M contacts who updated most in the most recent time period, e.g., last 12 hours. In some embodiments, group avatars are not used; and step 439 is omitted The permanent group is used in step 435 in the application that presented the prompt to the user to input a group of one or more items. For example, an email is sent to all contacts in the permanent group.

In step 441, it is determined whether the dynamic grouping of items is complete. If so, the process ends. Otherwise, control passes back to step 401 too update/determine the current context at the user equipment.

FIG. 4B is a flowchart of a process 450 for updating group context, according to one embodiment. Process 450 is one embodiment of an update process that can be used in step 407, or step 415, step 419 or step 431. Process 450 is a means for determining context associated with each group comprising one or more items for a plurality of groups.

In step 451, the current context is determined, e.g., by reading data from current context data structure 102. This is an example means for determining current context at a device operated by a user. In step 453, it is determined whether there is user related text, e.g., typed by user into a document or message related to a current application, received from another application or network service or other user equipment. If not, then control passes to step 457, described below. If so, then in step 455 the keywords and topic of the text is determined, e.g., using semantics engine 130, as the topic and keywords of the current context. In some embodiments, the current context includes the current topic and keywords and steps 453 and 455 are omitted.

In step 457, it is determined whether the user has input an item into the group input form for the application, e.g., the item is included in a group of items used as input to an application as determined in step 421. If not, control passes to step 461, described below.

If so, then in step 459 the count is incremented or current date added or both in the fields associated with the current context for the item, e.g., in a time period field 330 that holds data that matches the current time period, an application field 340 that holds data that matches the current application, a geolocation field 350 that holds data that matches the current geolocation, a topic field 360 that holds data that matches the current topic, and a keyword field 370 that holds data that matches a current keyword of one or more keywords for the item. If no field holds data that matches a component of the current context, a new field is added for that component in the item, with a count of 1 and the current date in the dates field. If the item is not already in the items data structure 300, then fields 310, 312 and 320 for the item are added to the data structure 300.

In step 461, it is determined whether the user has input a group into the group input form for the application, e.g., a group of items is used as input to an application as determined in step 421. If not, control passes to step 465, described below.

If so, then in step 463 the count is incremented or current date added or both in the fields associated with the current context for the group, e.g., in a time period field 230 that holds data that matches the current time period, an application field 240 that holds data that matches the current application, a geolocation field 250 that holds data that matches the current geolocation, a topic field 260 that holds data that matches the current topic, and a keyword field 270 that holds data that matches a current keyword of one or more keywords for the item. If no field holds data that matches a component of the current context, a new field is added for that component in the group, with a count of 1 and the current date in the dates field. If the group is not already in the prior groups data structure (e.g., data structure 144), then fields 202, 204, 206, 210 and 220 for the group are added as a new prior group entry 200 to the prior groups data structure 144.

In step 465, any date field with one or more dates past an expiration date for a corresponding item and context component are deleted from the dates field and the count decremented by the number of dates deleted. If an item is not a permanent item, and all the context components have counts of zero, then, in some embodiments, the item is deleted from the items data structure 300.

In step 467, any date field with one or more dates past an expiration date for a corresponding group and context component are deleted from the dates field and the count decremented by the number of dates deleted. If a group is not a permanent group, and all the context components have counts of zero, then, in some embodiments, the group is deleted from the prior groups data structure.

FIG. 4C is a flowchart of a process 470 for presenting a group of items, according to one embodiment. In some embodiments process 470 is used in any dynamic group module that presents a group to a user for any purpose. In some embodiments, process 470 is used during step 439 of process 400 described above with reference to FIG. 4A In step 471, a permanent (named) group for presentation is determined. For example, a new group is defined and named in step 437 and passed to step 439 to form a group avatar.

In step 473 it is determined whether the group is to have an optional dynamic group avatar. In some embodiments, a static group avatar is used or no avatar at all, just a list of items in the group. Any method may be used to determine whether the group avatar is a dynamic group avatar. For example, in some embodiments, the user is presented with a prompt to indicate whether to define a dynamic group avatar for the group. In some embodiments, default computer instructions indicate that a dynamic group avatar is to be generated for the group.

If it is determined, in step 473, that a dynamic group avatar is not to be generated, then control passes to step 491. In step 491, it is determined whether the group is to have an optional static group avatar. If so, then in step 493 the static group avatar is determined, e.g., received from a source using any method known in the art. In some embodiments a group avatar is determined based on one or more images associated with a corresponding one or more items in the group, e.g., one or more item avatars retrieved from item avatar field 314 of one or more items in the group, such as the first two items in the group.

Control then passes to step 483 to include the group avatar in a response prepared for presentation to the user, e.g., in a response returned to a calling program, such as application 114 on UE 101.

In step 485 a list of items in the group is also included in the response, e.g., a list of item IDs pointing to item ID field 310 in the items data structure 300. If it is determined in step 491 that there is not a static group avatar to be included for the group, then control passes from step 491 also to step 485, bypassing step 483, to include only the list of items in the response for presentation.

In step 487, the response is returned for presentation to the user, using any method known in the art, such as a return to a calling process or a message sent to a client process, such as an HTTP response message to a browser.

If it is determined in step 473 that a dynamic group avatar is to be generated, then in step 475 the recent activities for the items of the named group are determined. For example, the item activity field 214 is read from group data structure entry 200 for the group or requested from another process, such as a process that updates field 214.

In step 477, the relevance of the items in the group are determined. In some embodiments, the relevance is based, at least in part, on the recent activities. Thus, step 477 is an example means for determining relevance of each item of the permanent group.

In step 479, a number M most relevant items of the group are selected to represent the group. Any number M may be used. In step 481 images representing the M most relevant items are combined to generate the group avatar. In some embodiments, M is selected so that when M images are combined to generate a reasonably-sized group avatar, the individual M images can still be reasonably well distinguished. For example, in an illustrated embodiment, M is four. Step 481 is an example means for generating a group avatar for the permanent group based on a number M of images associated with the number M of items that are determined to have the most relevance.

In some embodiments, the M images representing the M items are included in the group avatar in a particular order based on relevance. For example, the items are presented in the group avatar in order of decreasing relevance from top to bottom and at each level from left to right. Other arrangements are used in other embodiments, such as bottom to top or right to left, or clockwise or counterclockwise from a top, left, right or bottom position of the group avatar.

The dynamic group avatar is included in the response for presentation in step 483, described above. Example presentations of dynamic group avatars are described below with reference to FIG. 5C, FIG. 5D and FIG. 5E. The dynamic determination of relevance makes the resulting multi-image avatar a dynamic group avatar, well suited for dynamic grouping of items. The dynamic group avatar is means of achieving the advantage of compactly indicating a group and letting the user know that the group is of particular interest because of recent activity or other measure of relevance. This make it more likely that a relevant item is presented using less display area, thus saving display operations, and any supporting display, memory and processor resources on the device.

Referring again to FIG. 5C, in some embodiments, the group avatar 570 comprises multiple item images 572a through 572d, collectively referenced hereinafter as item images 572, each representing one item of the group. In some embodiments a maximum M item images 572 are included in the group avatar 570. In the illustrated embodiment, M=4. In some embodiments, the images associated with the M most relevant items are included in a dynamic group avatar. In some of these embodiments, the M most relevant item images are presented in order of decreasing relevance, e.g., counter-clockwise from the top, so that item images 572a through item image 572d represent items of ever decreasing relevance from the most relevant item having image 572a.

Figure 5D:
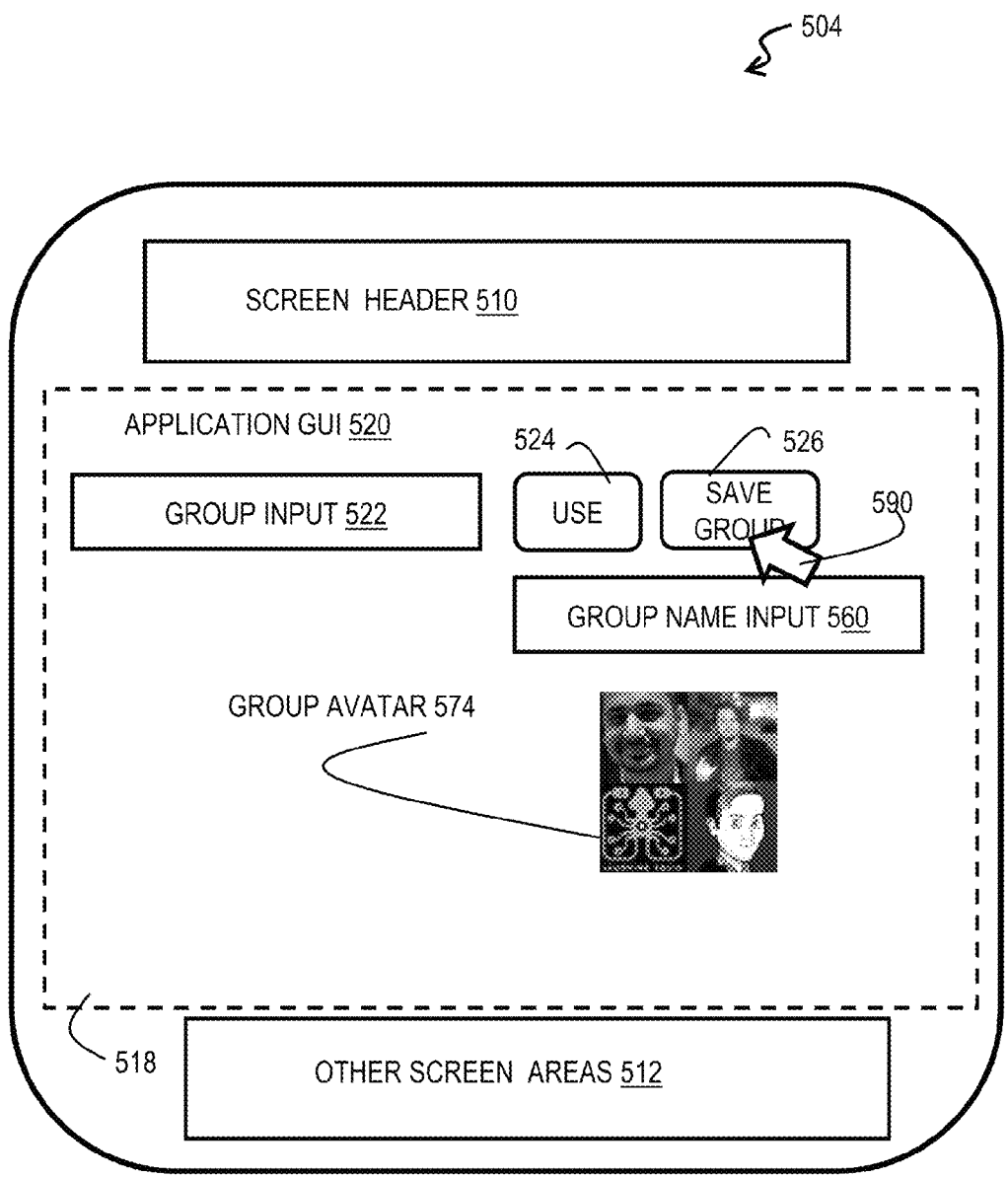

An alternative group avatar is presented in FIG. 5D. FIG. 5D is a diagram of a graphical user interface 504 presented on a display of user equipment, e.g., UE 101, according to another embodiment. The application area 518 includes the group input area 522, use button 524 save group button 526, and cursor 590, as described above with respect to GUI 503. In GUI 504, however, the dynamic group avatar 574 comprises a square made up of four square item images representing four different contacts who belong to the named group and most recently updated their social network pages.

Figure 5E:
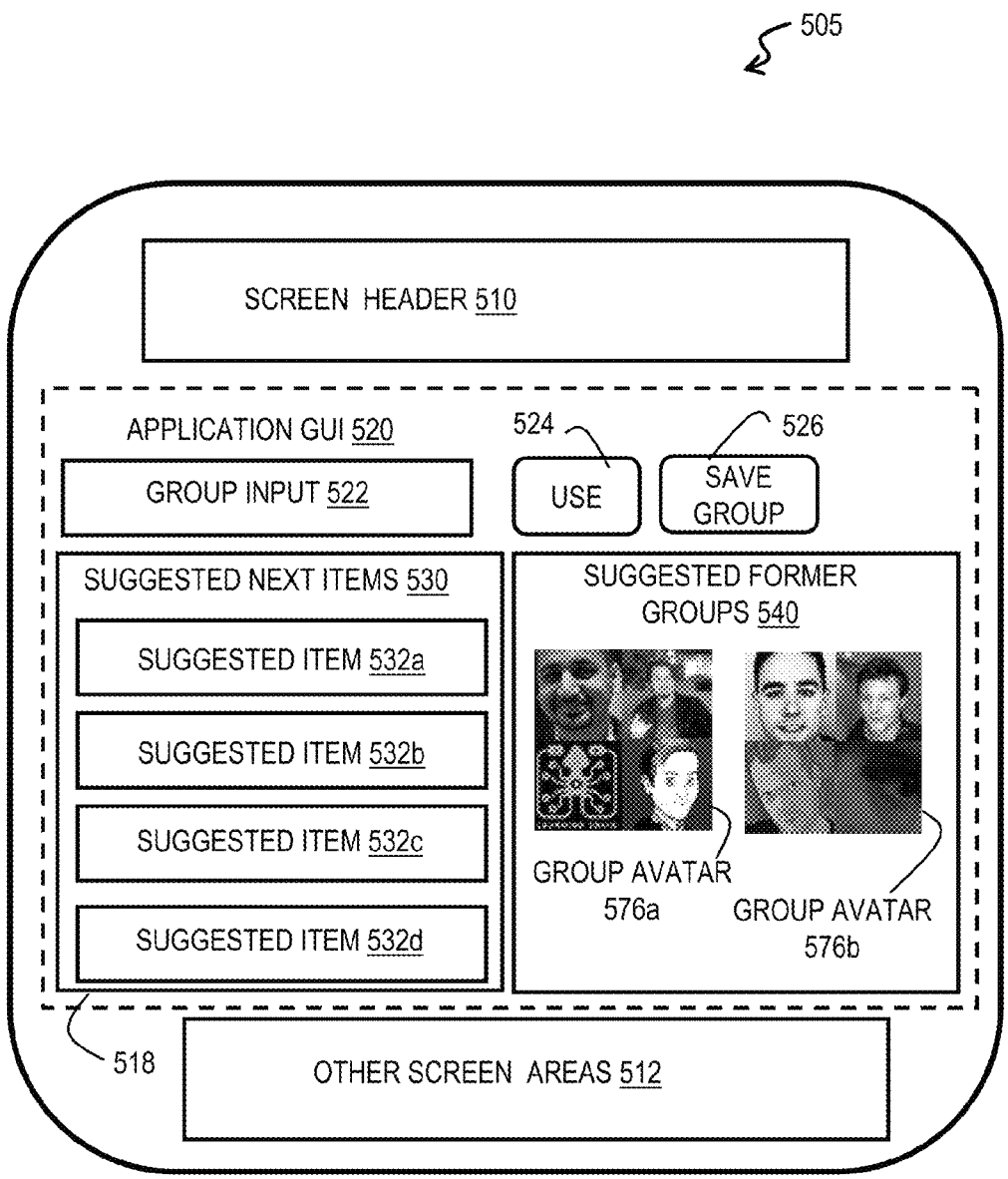

In some embodiments, one or more group avatars are used to present suggested groups. FIG. 5E is a diagram of a graphical user interface 505 presented on a display of user equipment, e.g., UE 101, according to an embodiment. The application area 518 includes the group input area 522, use button 524, the save group button 526, the suggested next items area 530 and the suggested prior groups area 540, described above with respect to GUI 502 in FIG. 5B. In this embodiment, however, suggested group areas in suggested prior groups area 540 are presented as dynamic avatars 576a and 576b. Thus, GUI 505 is an example means for causing a group avatar for the suggested group to be presented.

The processes described herein for providing dynamic grouping of items may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
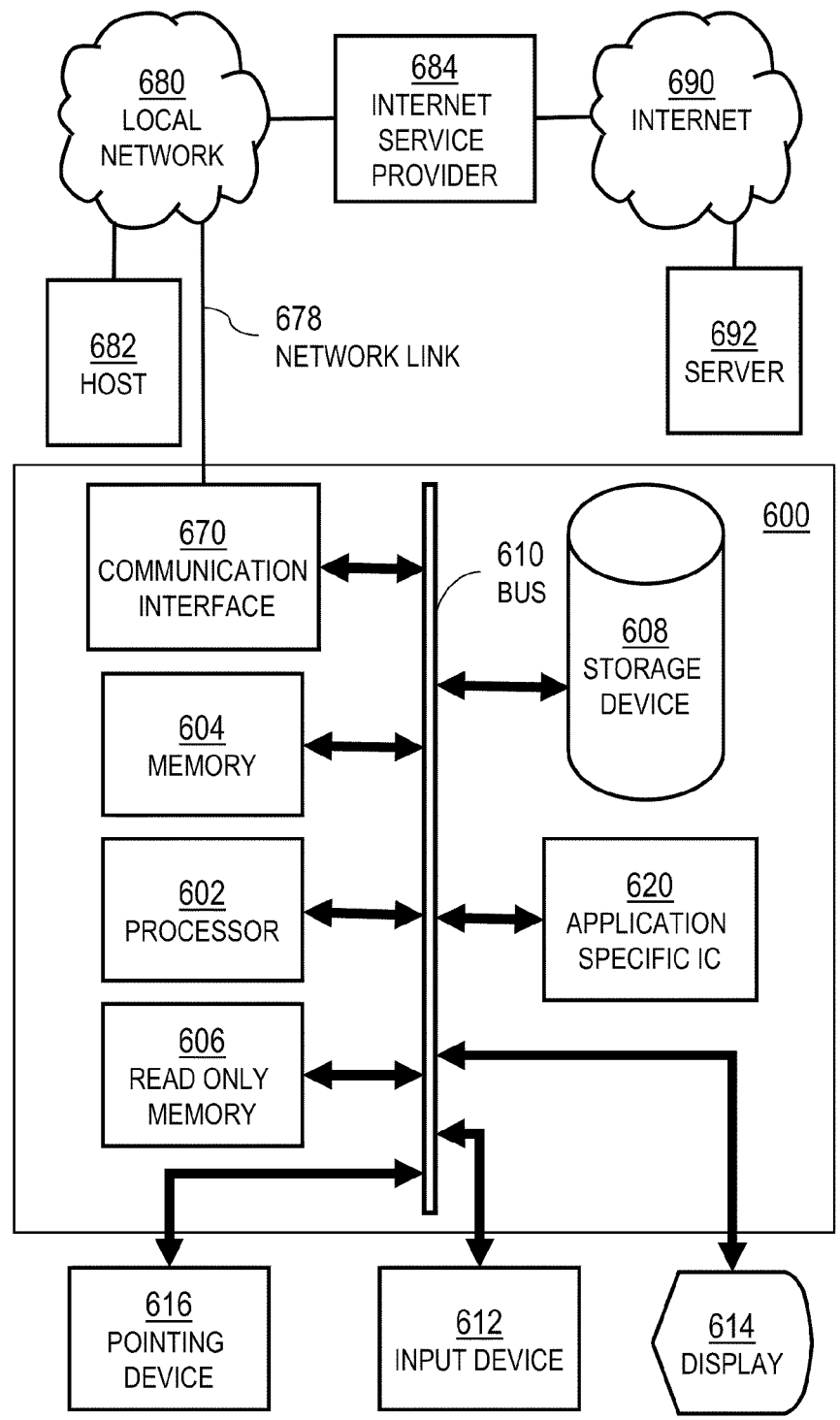
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide dynamic grouping of items as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing dynamic grouping of items.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing dynamic grouping of items. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing dynamic grouping of items. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing dynamic grouping of items is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing dynamic grouping of items to the UE 101.

The term "computer-readable medium" as used herein to refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
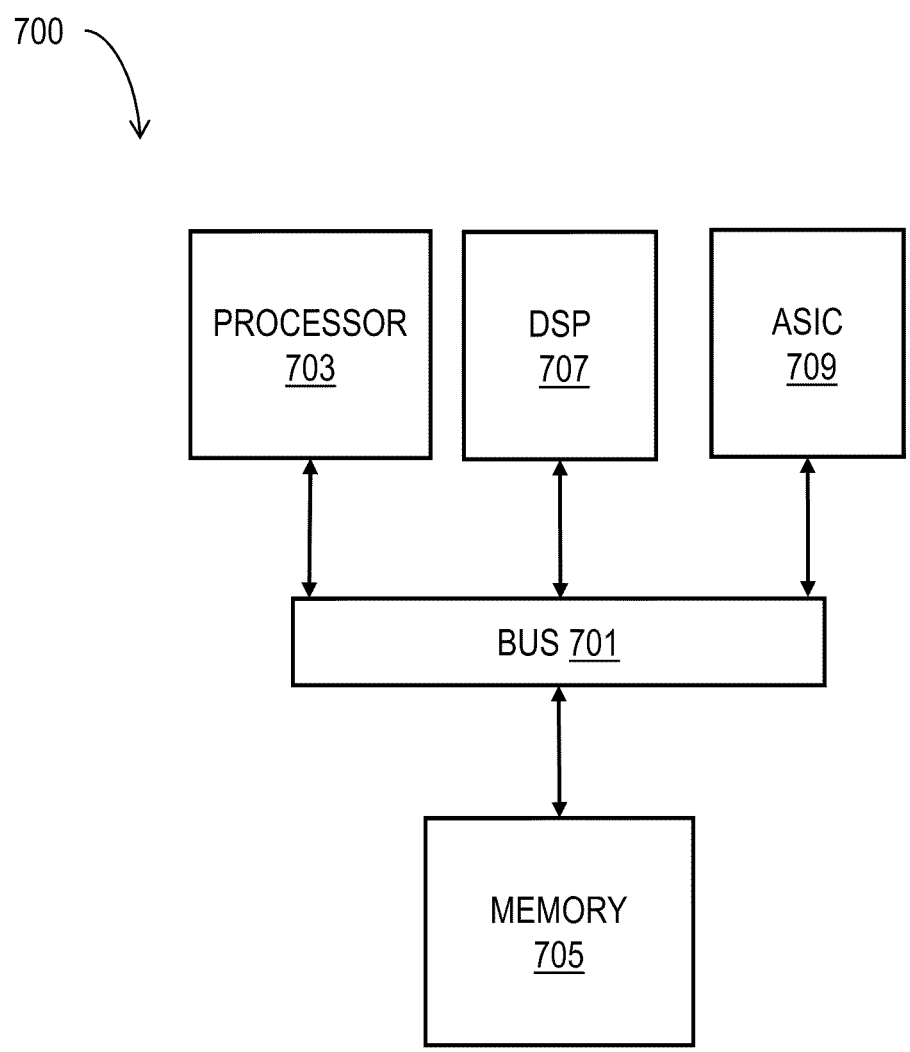
FIG. 7 is a diagram of a chip set that can be used to implement an embodiment of the invention.

FIG. 7 illustrates a chip set 700 upon which an embodiment of the invention may be implemented. Chip set 700 is programmed to provide dynamic grouping of items as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of providing dynamic grouping of items.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide dynamic grouping of items. The memory 705 also stores the data associated with or generated by the execution of the inventive steps.

Figure 8:
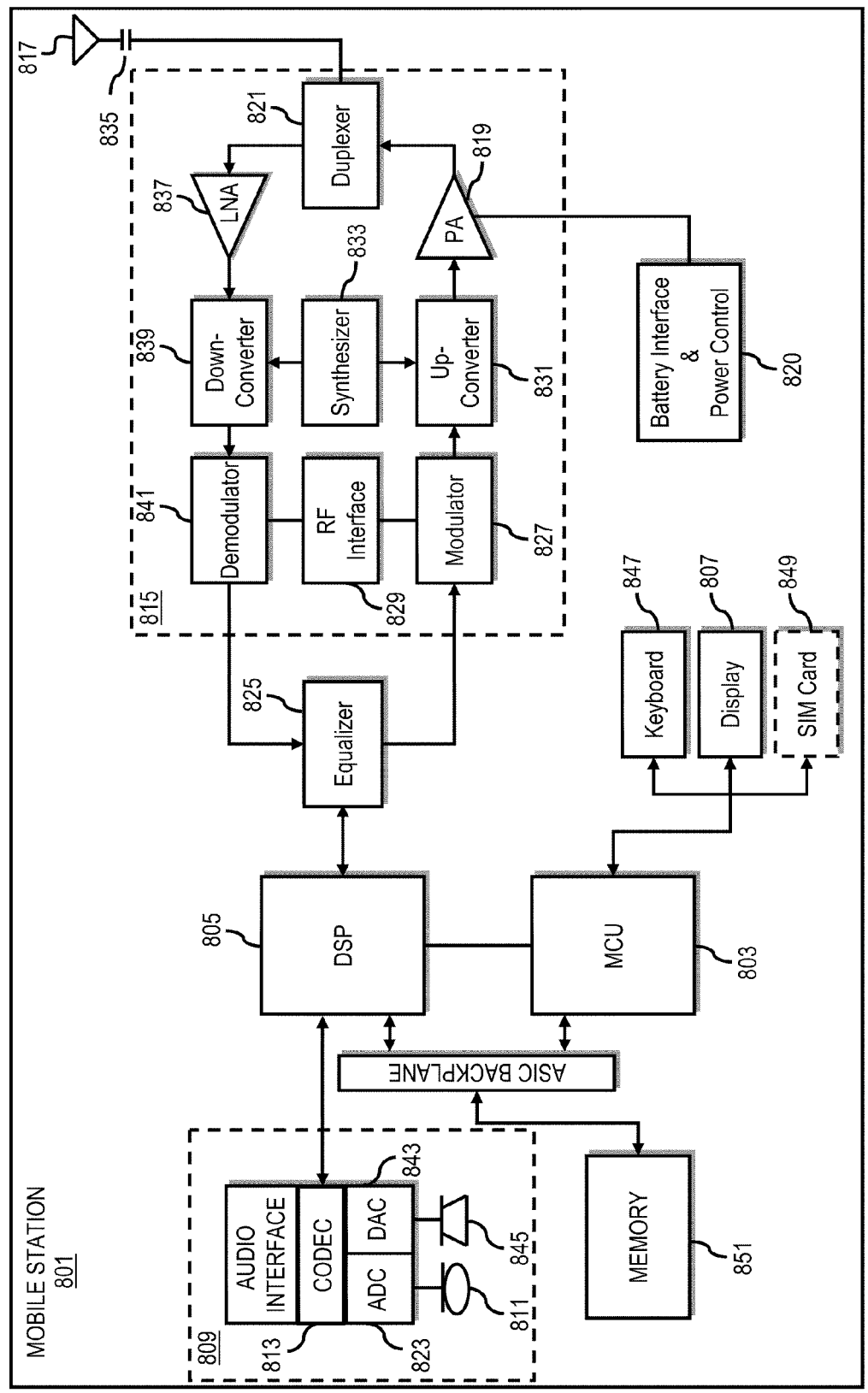
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of providing dynamic grouping of items. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing dynamic grouping of items. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to providing dynamic grouping of items. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, at an apparatus, a context associated with each of a plurality of groups, each of the groups comprising items;
    determining, at the apparatus, a current context at a device, wherein the current context specifies one or more time conditions and one or more geographic locations associated with the device;
    causing, at least in part by the apparatus, a generation of at least one relevance metric for the each group based, at least in part, on one or more factors associated with the items;
    determining, at the apparatus, a multi-dimensional relevance metric of each item of the each group;
    causing, at least in part by the apparatus, a generation of a group image for the each group based on a number M of images associated with the number M of items that are determined to have a multi-dimensional relevance metric value above a threshold value;
    in response to a prompt presented for input to indicate at least one of the items, causing, at least in part by the apparatus, a presentation of at least two group images, wherein each of the group images includes a collage of representative images of the each presented group, and the each presented group matches a group multi-dimensional relevance metric threshold value based on the at least one relevance metric;
    in response to one or more user inputs, generating, at the apparatus, a new group of items using the at least one of the items and one or more of the at least two group images;
    causing, at least in part, a presentation of the new group;
    determining, by the apparatus, an update to the multi-dimensional relevance metric of the each item based, at least in part, on a decay factor;
    updating, by the apparatus, the collage of representative images of the each presented group based, at least in part, on the update to the multi-dimensional relevance metric of the each item; and
    causing, at least in part by the apparatus, an updated presentation of the at least two group images based on the updated collage of representative images of the each presented group,
    wherein the representative images of the each presented group are determined as most relevant to the current context at the device, and
    wherein the presented group images are identical-sized and distinguishable from each other.

2. A method of claim 1, wherein the current context further specifies at least one of a user identifier, an application executed on the device, a network service communicating with the device, a keyword from a sample of text, a topic for the sample of text, one or more network conditions, one or more applications being executed on the device, or a combination thereof.

3. A method of claim 2, wherein the one or more network conditions include one or more network bandwidth conditions, one or more network noise conditions, or a combination thereof.

4. A method of claim 1, further comprising:
    causing, at least in part, a presentation of a prompt that requests a name for the new group; and
    in response to receiving a name for the new group, storing data indicating the new group as a permanent group associated with the name received.

5. A method of claim 1, wherein the collage of representative images are presented as identical-sized thumbnails within the each group image while distinguishable from each other.

6. A method of claim 1, wherein the multi-dimensional relevance metric of the each item is based, at least in part, on one or more current context, one or more past context, one or more key word, counts, expired counts, a weighted sum of numbers of the counts and expired counts, or a combination thereof.

7. A method of claim 1, wherein the images of the number of items to be included in the group image are determined as most relevant further based on one or more past context, one or more updates, one or more key words, one or more counts, one or more expired counts, or a combination thereof.

8. A method of claim 1,
wherein the multi-dimensional relevance metric of the each item includes at least two of recent activities, time periods, event frequencies, applications, and geolocations.

9. A method of claim 8, wherein each item is a contact for communications, an event, or a shopping item, and the most relevant items are presented as within the group image in order of most recently updated context.

10. An apparatus comprising:
at least one processor; and
at least one memory including computer program code,
the at least one memory and the computer program code configured to, with the at least one processor, cause the apparatus to perform at least the following,
determine a context associated with each of a plurality of groups, each of the groups comprising items;
determine a current context at a device, wherein the current context specifies one or more time conditions and one or more geographic locations associated with the device;
cause, at least in part, a generation of at least one relevance metric for the each group based, at least in part, on one or more factors associated with the items;
determine a multi-dimensional relevance metric of each item of the each group;
cause, at least in part, a generation of a group image for the each group based on a number M of images associated with the number M of items that are determined to have a multi-dimensional relevance metric value above a threshold value;
in response to a prompt presented for input to indicate at least one of the items, cause, at least in part, a presentation of at least two group images, wherein each of the group images includes a collage of representative images of the each presented group, and the each presented group matches a group multi-dimensional relevance metric threshold value based on the at least one relevance metric;
in response to one or more user inputs, generate a new group of items using the at least one of the items and one or more of the at least two group images;
cause, at least in part, a presentation of the new group;
determine an update to the multi-dimensional relevance metric of the each item based, at least in part, on a decay factor;
update the collage of representative images of the each presented group based, at least in part, on the update to the multi-dimensional relevance metric of the each item; and
cause, at least in part, an updated presentation of the at least two group images based on the updated collage of representative images of the each presented group,
wherein the representative images of the each presented group are determined as most relevant to the current context at the device, and
wherein the presented group images are identical-sized and distinguishable from each other.

11. An apparatus of claim 10, wherein each items is a contact for communications.

12. An apparatus of claim 10, wherein the current context further specifies at least one of a user identifier, an application executed on the device, a network service communicating with the device, a keyword from a sample of text, a topic for the sample of text, one or more network conditions, one or more applications being executed on the device, or a combination thereof.

13. An apparatus of claim 10, wherein the apparatus is further caused, at least in part, to:
cause a prompt to be presented, wherein the prompt requests a name for the new group; and
in response to receiving a name for the new group, cause data indicating the new group to be stored as a permanent group associated with the name received.

14. An apparatus of claim 10, wherein the collage of representative images are presented as identical-sized thumbnails within the each group image while distinguishable from each other.

15. An apparatus of claim 14, wherein causing the new group to be presented further comprises causing a group image for the new group to be presented.

16. An apparatus of claim 10, wherein the apparatus is a mobile device further comprising:
user interface circuitry and user interface software configured to facilitate user control of at least two functions of the mobile device through use of a display and configured to respond to user input; and
a display and display circuitry configured to display at least a portion of a user interface of the mobile device, the display and display circuitry configured to facilitate user control of the at least two functions of the mobile device.

17. A non-transitory computer-readable storage medium carrying one or more sequences of one or more instructions which, when executed by one or more processors, cause an apparatus to at least perform the following steps:
determining a context associated with each of a plurality of groups, each of the groups comprising items;
determining a current context at a device, wherein the current context specifies one or more time conditions and one or more geographic locations associated with the device;
causing, at least in part, a generation of at least one relevance metric for the each group based, at least in part, on one or more factors associated with the items;
determining a multi-dimensional relevance metric of each item of the each group;
causing, at least in part, a generation of a group image for the each group based on a number M of images associated with the number M of items that are determined to have a multi-dimensional relevance metric value above a threshold value;
in response to a prompt presented for input to indicate at least one of the items, causing, at least in part, a presentation of at least two group images, wherein each of the group images includes a collage of representative images of the each presented group, and the each presented group matches a group multi-dimensional relevance metric threshold value based on the at least one relevance metric;
in response to one or more user inputs, generating a new group of items using the at least one of the items and one or more of the at least two group images;
causing, at least in part, a presentation of the new group;
determining an update to the multi-dimensional relevance metric of the each item based, at least in part, on a decay factor;
updating the collage of representative images of the each presented group based, at least in part, on the update to the multi-dimensional relevance metric of the each item; and causing, at least in part, an updated presentation of the at least two group images based on the updated collage of representative images of the each presented group, wherein the representative images of the each presented group are determined as most relevant to the current context at the device, and wherein the presented group images are identical-sized and distinguishable from each other.

18. A non-transitory computer-readable storage medium of claim 17, wherein the current context further specifies at least one of a user identifier, an application executed on the device, a network service communicating with the device, a keyword from a sample of text, a topic for the sample of text, one or more network conditions, one or more applications being executed on the device, or a combination thereof.

19. A non-transitory computer-readable storage medium of claim 17, wherein the apparatus is caused, at least in part, to further perform:

causing, at least in part, a presentation of a prompt that requests a name for the new group; and in response to receiving a name for the new group, storing data indicating the new group as a permanent group associated with the name received.

20. A non-transitory computer-readable storage medium of claim 17, wherein the collage of representative images are presented as identical-sized thumbnails within the each group image while distinguishable from each other.

21. A non-transitory computer-readable storage medium of claim 20, wherein causing the new group to be presented further comprises causing a group image for the new group to be presented.

\* \* \* \* \*